United States Patent
Joy et al.

(10) Patent No.: US 6,542,991 B1
(45) Date of Patent: Apr. 1, 2003

(54) MULTIPLE-THREAD PROCESSOR WITH SINGLE-THREAD INTERFACE SHARED AMONG THREADS

(75) Inventors: William N. Joy, Aspen, CO (US); Marc Tremblay, Menlo Park, CA (US); Gary Lauterbach, Los Altos, CA (US); Joseph I. Chamdani, Santa Clara, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 0 days.

(21) Appl. No.: 09/309,734

(22) Filed: May 11, 1999

(51) Int. Cl.[7] ............................................... G06F 12/12
(52) U.S. Cl. ........................................ 712/228; 709/108
(58) Field of Search ......................... 712/228; 709/107, 709/108

(56) References Cited

U.S. PATENT DOCUMENTS

| | | | |
|---|---|---|---|
| 5,452,452 A | | 9/1995 | Gaetner et al. ............. 709/103 |
| 5,513,130 A | | 4/1996 | Redmond ....................... 703/2 |
| 5,584,023 A | | 12/1996 | Hsu ........................... 707/204 |
| 5,684,993 A | * | 11/1997 | Willman ..................... 709/106 |
| 5,692,193 A | | 11/1997 | Jagannathan et al. ....... 709/106 |
| 5,721,868 A | | 2/1998 | Yung et al. ................. 711/149 |
| 5,724,565 A | * | 3/1998 | Dubey ........................ 712/245 |
| 5,742,806 A | | 4/1998 | Reiner et al. .............. 704/229 |
| 5,752,027 A | | 5/1998 | Familiar .................... 707/103 |
| 5,761,285 A | | 6/1998 | Stent ......................... 379/112 |
| 5,778,247 A | | 7/1998 | Tremblay ................... 712/23 |
| 5,809,415 A | | 9/1998 | Rossmann .................. 455/422 |
| 5,860,138 A | * | 1/1999 | Engebretsen ............... 711/202 |
| 5,861,761 A | | 1/1999 | Kean ........................... 326/41 |
| 5,960,458 A | * | 9/1999 | Kametani ................... 711/147 |
| 6,058,466 A | * | 2/2000 | Panwar ........................ 712/15 |
| 6,038,647 A | * | 3/2000 | Shimizu ...................... 711/129 |
| 6,061,710 A | * | 5/2000 | Eickemeyer et al. ........ 709/107 |
| 6,105,051 A | * | 8/2000 | Borkenhagen et al. ...... 709/100 |
| 6,122,712 A | * | 9/2000 | Torii .......................... 709/102 |
| 6,205,519 B1 | * | 3/2001 | Aglietti et al. .............. 711/126 |
| 6,420,903 B1 | * | 7/2002 | Singh et al. .................. 326/93 |

FOREIGN PATENT DOCUMENTS

WO WO 99/21082 4/1999 ............. G06F/9/38

OTHER PUBLICATIONS

Tremblay et al., "A Three Dimensional Register File For Superscalar Processors", Jan. 1995, pp. 191–201, Proceedings of the 28th Annual Hawaii International Conference on Systems Sciences.

Gulati, M. et al.: "Performance Study of a Multithreaded Superscalar Microprocessor" Proceedings. International Symposium on High–Performance Computer Architecture, 1996, pp. 291–301, XP000572068.

Gunther, B.K.: "Multithreading with Distributed Functional Units" IEEE Transactions on Computers, US, IEEE Inc. New York, vol. 46, No. 4, Apr. 1, 1997, pp. 399–411, XP000656016, ISSN: 0018–9340.

Klass, F. et al.: "A New Family of Semidynamic and Dynamic Flip–Flops with Embedded Logic for High–Performance Processors" IEEE Journal of Solid–State Circuits, IEEE Inc. New York, US, vol. 34, No. 5, Jun. 11, 1998, pp. 712–716, XP002156316, ISSN: 0018–9200.

* cited by examiner

Primary Examiner—Eric Coleman
(74) Attorney, Agent, or Firm—Zagorin, O'Brien & Graham, LLP

(57) ABSTRACT

A processor includes logic for tagging a thread identifier (TID) for usage with processor blocks that are not stalled. Pertinent non-stalling blocks include caches, translation look-aside buffers (TLB), a load buffer asynchronous interface, an external memory management unit (MMU) interface, and others. A processor includes a cache that is segregated into a plurality of N cache parts. Cache segregation avoids interference, "pollution", or "cross-talk" between threads. One technique for cache segregation utilizes logic for storing and communicating thread identification (TID) bits. The cache utilizes cache indexing logic. For example, the TID bits can be inserted at the most significant bits of the cache index.

24 Claims, 21 Drawing Sheets

A Three Dimensional Register File

MULTIPLE-THREAD PROCESSOR WITH SINGLE-THREAD INTERFACE SHARED AMONG THREADS

CROSS REFERENCE

The present invention is related to subject matter disclosed in the following co-pending patent applications:

1. U.S. patent application Ser. No. 09/309,732 entitled, "Processor with Multiple-Thread, Vertically-Threaded Pipeline", naming William Joy, Marc Tremblay, Gary Lauterbach, and Joseph Chamdani as inventors and filed on even date herewith;
1. U.S. patent application Ser. No. 09/309,731, now U.S. Pat. No. 6,351,808, entitled, "Vertically-Threaded Processor with Multi-Dimensional Storage", naming William Joy, Marc Tremblay, Gary Lauterbach, and Joseph Chamdani as inventors and filed on even date herewith;
2. U.S. patent application Ser. No. 09/309,730 entitled, "Multi-Threaded Processor By Multiple-Bit Flip-Flop Global Substitution", naming William Joy, Marc Tremblay, Gary Lauterbach, and Joseph Chamdani as inventors and filed on even date herewith;
3. U.S. patent application Ser. No. 09/309,735 entitled, "Switching Method in a Multi-Threaded Processor", naming William Joy, Marc Tremblay, Gary Lauterbach, and Joseph Chamdani as inventors and filed on even date herewith; and
4. U.S. patent application Ser. No. 09/309,733, now U.S. Pat. No. 6,341,347, entitled, "Thread Switch Logic in a Multiple-Thread Processor", naming William Joy, Marc Tremblay, Gary Lauterbach, and Joseph Chamdani as inventors and filed on even date herewith.

BACKGROUND OF THE INVENTION

1. Field of the Invention

The present invention relates to processor or computer architecture. More specifically, the present invention relates to multiple-threading processor architectures and methods of operation and execution.

2. Description of the Related Art

In many commercial computing applications, a large percentage of time elapses during pipeline stalling and idling, rather than in productive execution, due to cache misses and latency in accessing external caches or external memory following the cache misses. Stalling and idling are most detrimental, due to frequent cache misses, in database handling operations such as OLTP, DSS, data mining, financial forecasting, mechanical and electronic computer-aided design (MCAD/ECAD), web servers, data servers, and the like. Thus, although a processor may execute at high speed, much time is wasted while idly awaiting data.

One technique for reducing stalling and idling is hardware multithreading to achieve processor execution during otherwise idle cycles. Hardware multithreading involves replication of some processor resources, for example replication of architected registers, for each thread. Replication is not required for most processor resources, including instruction and data caches, translation look-aside buffers (TLB), instruction fetch and dispatch elements, branch units, execution units, and the like.

Unfortunately duplication of resources is costly in terms of integrated circuit consumption and performance.

Accordingly, improved multithreading circuits and operating methods are needed that are economical in resources and avoid costly overhead which reduces processor performance.

SUMMARY OF THE INVENTION

A processor includes logic for tagging a thread identifier (TID) for usage with processor blocks that are not stalled. Pertinent non-stalling blocks include caches, translation look-aside buffers (TLB), a load buffer asynchronous interface, an external memory management unit (MMU) interface, and others.

A processor includes a cache that is segregated into a plurality of N cache parts. Cache segregation avoids interference, "pollution", or "cross-talk" between threads. One technique for cache segregation utilizes logic for storing and communicating thread identification (TID) bits. The cache utilizes cache indexing logic. For example, the TID bits can be inserted at the most significant bits of the cache index.

A processor reduces wasted cycle time resulting from stalling and idling, and increases the proportion of execution time, by supporting and implementing both vertical multithreading and horizontal multithreading. Vertical multithreading permits overlapping or "hiding" of cache miss wait times. In vertical multithreading, multiple hardware threads share the same processor pipeline. A hardware thread is typically a process, a lightweight process, a native thread, or the like in an operating system that supports multithreading. Horizontal multithreading increases parallelism within the processor circuit structure, for example within a single integrated circuit die that makes up a single-chip processor. To further increase system parallelism in some processor embodiments, multiple processor cores are formed in a single die. Advances in on-chip multiprocessor horizontal threading are gained as processor core sizes are reduced through technological advancements.

The described processor structure and operating method may be implemented in many structural variations. For example two processor cores are combined with an on-chip set-associative L2 cache in one system. In another example, four processor cores are combined with a direct RAMBUS interface with no external L2 cache. A countless number of variations are possible. In some systems, each processor core is a vertically-threaded pipeline.

In a further aspect of some multithreading system and method embodiments, a computing system may be configured in many different processor variations that allocate execution among: a plurality of execution threads. For example, in a "1C2T" configuration, a single processor die includes two vertical threads. In a "4C4T" configuration, a four-processor multiprocessor is formed on a single die with each of the four processors being four-way vertically threaded. Countless other "nCkT" structures and combinations may be implemented on one or more integrated circuit dies depending on the fabrication process employed and the applications envisioned for the processor. Various systems may include caches that are selectively configured, for example as segregated L1 caches and segregated L2 caches, or segregated L1 caches and shared L2 caches, or shared L1 caches and shared L2 caches.

In an aspect of some multithreading system and method embodiments, in response to a cache miss stall a processor freezes the entire pipeline state of an executing thread. The processor executes instructions and manages the machine state of each thread separately and independently. The functional properties of an independent thread state are stored throughout the pipeline extending to the pipeline registers to enable the processor to postpone execution of a stalling thread, relinquish the pipeline to a previously idle thread, later resuming execution of the postponed stalling thread at the precise state of the stalling thread immediately prior to the thread switch.

In another aspect of some multithreading system and method embodiments, a processor include a "four-dimensional" register structure in which register file structures are replicated by N for vertical threading in combination with a three-dimensional storage circuit. The multi-dimensional storage is formed by constructing a storage, such as a register file or memory, as a plurality of two-dimensional storage planes.

In another aspect of some multithreading system and method embodiments, a processor implements N-bit flip-flop global substitution. To implement multiple machine states, the processor converts 1-bit flip-flops in storage cells of the stalling vertical thread to an N-bit global flip-flop where N is the number of vertical threads.

In one aspect of some processor and processing method embodiments, the processor improves throughput efficiency and exploits increased parallelism by introducing multi-threading to an existing and mature processor core. The multithreading is implemented in two steps including vertical multithreading and horizontal multithreading. The processor core is retrofitted to support multiple machine states. System embodiments that exploit retrofitting of an existing processor core advantageously leverage hundreds of man-years of hardware and software development by extending the lifetime of a proven processor pipeline generation.

In another aspect of some multithreading system and method embodiments, a processor includes a thread switching control logic that performs a fast thread-switching operation in response to an L1 cache miss stall. The fast thread-switching operation implements one or more of several thread-switching methods. A first thread-switching operation is "oblivious" thread-switching for every N cycle in which the individual flip-flops locally determine a thread-switch without notification of stalling. The oblivious technique avoids usage of an extra global interconnection between threads for thread selection. A second thread-switching operation is "semi-oblivious" thread-switching for use with an existing "pipeline stall" signal (if any). The pipeline stall signal operates in two capacities, first as a notification of a pipeline stall, and second as a thread select signal between threads so that, again, usage of an extra global interconnection between threads for thread selection is avoided. A third thread-switching operation is an "intelligent global scheduler" thread-switching in which a thread switch decision is based on a plurality of signals including: (1) an L1 data cache miss stall signal, (2) an instruction buffer empty signal, (3) an L2 cache miss signal, (4) a thread priority signal, (5) a thread timer signal, (6) an interrupt signal, or other sources of triggering. In some embodiments, the thread select signal is broadcast as fast as possible, similar to a clock tree distribution. In some systems, a processor derives a thread select signal that is applied to the flip-flops by overloading a scan enable (SE) signal of a scannable flip-flop.

In an additional aspect of some multithreading system and method embodiments, a processor includes anti-aliasing logic coupled to an L1 cache so that the L1 cache is shared among threads via anti-aliasing. The L1 cache is a virtually-indexed, physically-tagged cache that is shared among threads. The anti-aliasing logic avoids hazards that result from multiple virtual addresses mapping to one physical address. The anti-aliasing logic selectively invalidates or updates duplicate L1 cache entries.

In another aspect of some multithreading system and method embodiments, a processor includes logic for attaining a very fast exception handling functionality while executing non-threaded programs by invoking a multithreaded-type functionality in response to an exception condition. The processor, while operating in multithreaded conditions or while executing non-threaded programs, progresses through multiple machine states during execution. The very fast exception handling logic includes connection of an exception signal line to thread select logic, causing an exception signal to evoke a switch in thread and machine state. The switch in thread and machine state causes the processor to enter and to exit the exception handler immediately, without waiting to drain the pipeline or queues and without the inherent timing penalty of the operating system's software saving and restoring of registers.

An additional aspect of some multithreading systems and methods is a thread reservation system or thread locking system in which a thread pathway is reserved for usage by a selected thread. A thread control logic may select a particular thread that is to execute with priority in comparison to other threads. A high priority thread may be associated with an operation with strict time constraints, an operation that is frequently and predominantly executed in comparison to other threads. The thread control logic controls thread-switching operation so that a particular hardware thread is reserved for usage by the selected thread.

In another aspect of some multithreading system and method embodiments, a processor includes logic supporting lightweight processes and native threads. The logic includes a block that disables thread ID tagging and disables cache segregation since lightweight processes and native threads share the same virtual tag space.

In a further additional aspect of some embodiments of the multithreading system and method, some processors include a thread reservation functionality.

BRIEF DESCRIPTION OF THE DRAWINGS

The features of the described embodiments are specifically set forth in the appended claims. However, embodiments of the invention relating to both structure and method of operation, may best be understood by referring to the following description and accompanying drawings.

FIG. 4A is a schematic block diagram illustrating control and storage blocks of a circuit employing high-speed multiple-bit flip-flops. FIG. 4B is a schematic circuit diagram that shows a multiple-bit bistable multivibrator (flip-flop) circuit. FIG. 4C is a timing diagram illustrating timing of the multiple-bit flip-flop.

The use of the same reference symbols in different drawings indicates similar or identical items.

DESCRIPTION OF THE EMBODIMENT(S)

Figure 1A:
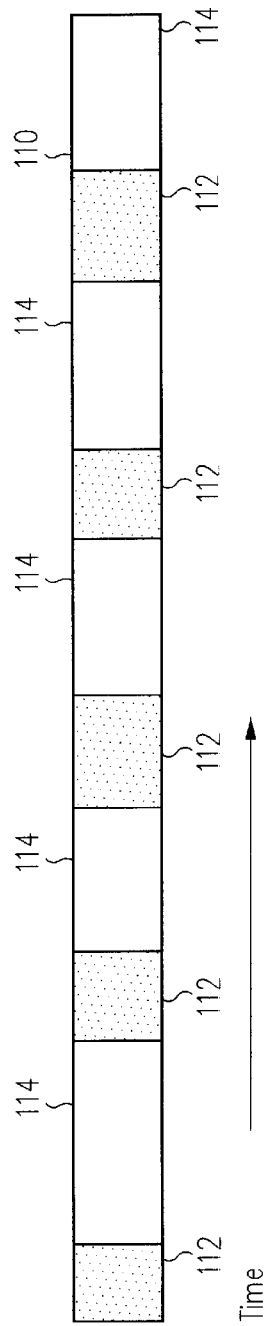
FIGS. 1A and 1B are timing diagrams respectively illustrating execution flow of a single-thread processor and a vertical multithread processor.
Figure 1B:
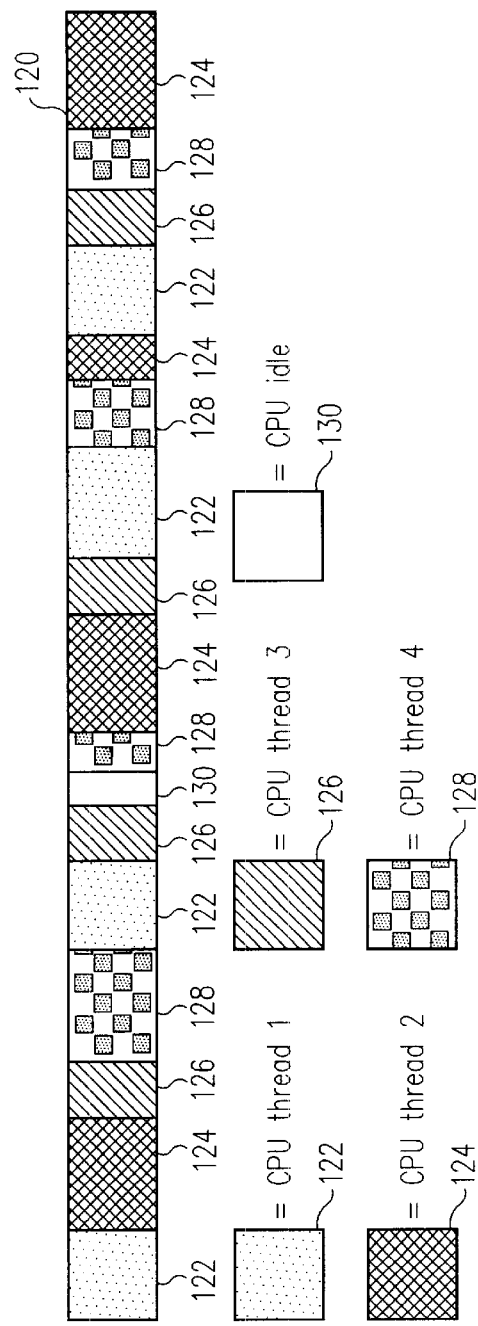

Referring to FIGS. 1A and 1B, two timing diagrams respectively illustrate execution flow 110 in a single-thread processor and instruction flow 120 in a vertical multithread processor. Processing applications such as database applications spend a significant portion of execution time stalled awaiting memory servicing. FIG. 1A is a highly schematic timing diagram showing execution flow 110 of a single-thread processor executing a database application. In an illustrative example, the single-thread processor is a four-way superscalar processor. Shaded areas 112 correspond to periods of execution in which the single-thread processor core issues instructions. Blank areas 114 correspond to time periods in which the single-thread processor core is stalled waiting for data or instructions from memory or an external cache. A typical single-thread processor executing a typical database application executes instructions about 30% of the time with the remaining 70% of the time elapsed in a stalled condition. The 30% utilization rate exemplifies the inefficient usage of resources by a single-thread processor.

FIG. 1B is a highly schematic timing diagram showing execution flow 120 of similar database operations by a multithread processor. Applications such as database applications have a large amount inherent parallelism due to the heavy throughput orientation of database applications and the common database functionality of processing several independent transactions at one time. The basic concept of exploiting multithread functionality involves utilizing processor resources efficiently when a thread is stalled by executing other threads while the stalled thread remains stalled. The execution flow 120 depicts a first thread 122, a second thread 124, a third thread 126 and a fourth thread 128, all of which are shown with shading in the timing diagram. As one thread stalls, for example first thread 122, another thread; such as second thread 124, switches into execution on the otherwise unused or idle pipeline. Blank areas 130 correspond to idle times when all threads are stalled. Overall processor utilization is significantly improved by multithreading. The illustrative technique of multithreading employs replication of architected registers for each thread and is called "vertical multithreading".

Vertical multithreading is advantageous in processing applications in which frequent cache misses result in heavy clock penalties. When cache misses cause a first thread to stall, vertical multithreading permits a second thread to execute when the processor would otherwise remain idle. The second thread thus takes over execution of the pipeline. A context switch from the first thread to the second thread involves saving the useful states of the first thread and assigning new states to the second thread. When the first thread restarts after stalling, the saved states are returned and the first thread proceeds in execution. Vertical multithreading imposes costs on a processor in resources used for saving and restoring thread states.

Figure 2A:
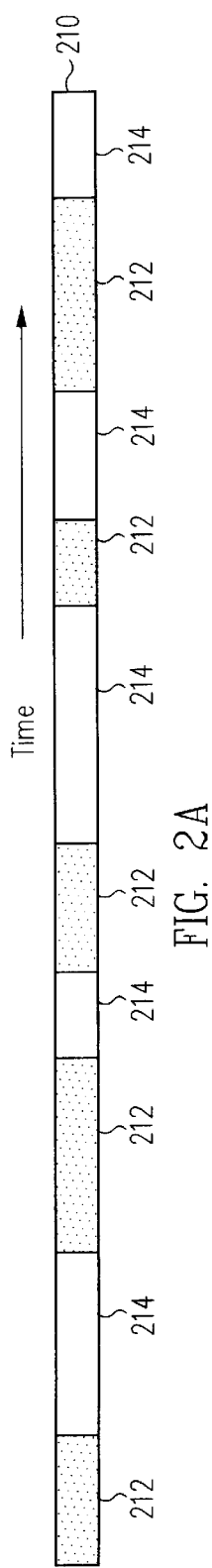
FIGS. 2A, 2B, and 2C are timing diagrams respectively illustrating execution flow of a single-thread processor, a vertical multithread processor, and a vertical and horizontal multithread processor.
Figure 2B:
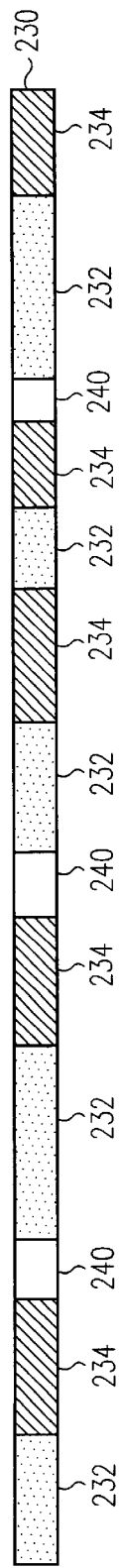
Figure 2C:
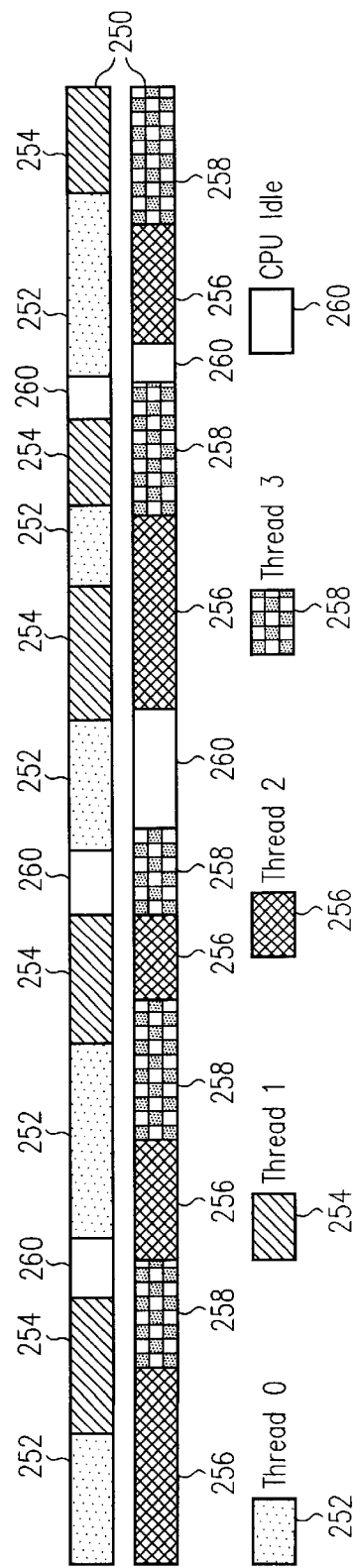

Referring to FIGS. 2A, 2B, and 2C, three highly schematic timing diagrams respectively illustrate execution flow 210 of a single-thread processor, execution flow 230 of a vertical multithread processor, and execution flow 250 a combined vertical and horizontal multithread processor. In FIG. 2A, shaded areas 212 showing periods of execution and blank areas 214 showing time periods in which the single-thread processor core is idle due to stall illustrate the inefficiency of a single-thread processor.

In FIG. 2B, execution flow 230 in a vertical threaded processor includes execution of a first thread 232, and a second thread 234, both shaded in the timing diagram, and an idle time shown in a blank area 240. Efficient instruction execute proceeds as one thread stalls and, in response to the stall, another thread switches into execution on the otherwise unused or idle pipeline. In the blank areas 240, an idle time occurs when all threads are stalled. For vertical multithread processor maintains a separate processing state for T executing threads. Only one of the threads is active at one time. The vertical multithreaded processor switches execution to another thread on a cache miss, for example an L1 cache miss.

A horizontal threaded processor, using a technique called chip-multiple processing, combines multiple processors on a single integrated circuit die. The multiple processors are vertically threaded to form a processor with both vertical and horizontal threading, augmenting executing efficiency and decreasing latency in a multiplicative fashion. In FIG. 2C execution flow 250 in a vertical and horizontal threaded processor includes execution of a first thread 252 executing on a first processor, a second thread 254 executing on the first processor, a first thread 256 executing on a second processor and a second thread 258 executing on the second processor. An idle time is shown in a blank area 260 for both the first and second processors. Execution of the first thread 252 and the second thread 254 on the first processor illustrate vertical threading. Similarly, execution of the first thread 256 and the second thread 258 on the second processor illustrate vertical threading. In the illustrative embodiment, a single integrated circuit includes both the first processor and the second processor, the multiple processors executing in parallel so that the multithreading operation is a horizontal multiple-threading or integrated-circuit chip multiprocessing (CMP) in combination with the vertical multithreading of the first processor and the second processor. The combination of vertical multithreading and horizontal multithreading increases processor parallelism and performance, and attains an execution efficiency that exceeds the efficiency of a processor with only vertical multithreading. The combination of vertical multithreading and horizontal multithreading also advantageously reduces communication latency among local (on-chip) multiprocessor tasks by eliminating much signaling on high-latency communication lines between integrated circuit chips. Horizontal multithreading further advantageously exploits processor speed and power improvements that inherently result from reduced circuit sizes in the evolution of silicon processing.

For each vertical threaded processor, efficient instruction execute proceeds as one thread stalls and, in response to the stall, another thread switches into execution on the otherwise unused or idle pipeline. In the blank areas 260, an idle time occurs when all threads are stalled.

Vertical multithreading is advantageously used to overcome or hide cache miss stalls, thereby continuing execution of the processor despite stalls. Vertical multithreading thus improves performance in commercial multiprocessor and multithreading applications. Vertical multithreading advantageously accelerates context switching time from millisecond ranges to nanosecond ranges. Vertical multithreading is highly advantageous in all processing environments including embedded, desktop, and server applications, and the like.

Horizontal multithreading or circuit chip multiprocessing further increases on-chip parallelism by exploiting increasingly smaller processor core sizes.

Although the illustrative example shows execution of two concurrent vertical multithreading processors with each concurrent vertical multithreading processor executing two threads, in other examples various numbers of concurrently executing processors may execute various numbers of threads. The number of threads that execute on one processor may be the same or different from the number of threads executing concurrently and in parallel on another processor.

In some processor designs, vertical and horizontal multithreading is incorporated into the fundamental design of the processors, advantageously creating modular and flexible structures that promote scalability of design. In other processor designs, multithreading is incorporated into existing and mature processor designs to leverage existing technological bases and increasing performance of multiprocessing and multithreading applications. One highly suitable example of processor design for retrofitting with multithreading functionality is an UltraSPARC processor. In some designs, vertical and horizontal multithreading are achieved with minimal retrofitting of an existing processor core, advantageously reducing logic and physical design changes and avoiding global chip re-routing, recomposing, and the expense of heavy redesign of integrated circuits.

Figure 3:
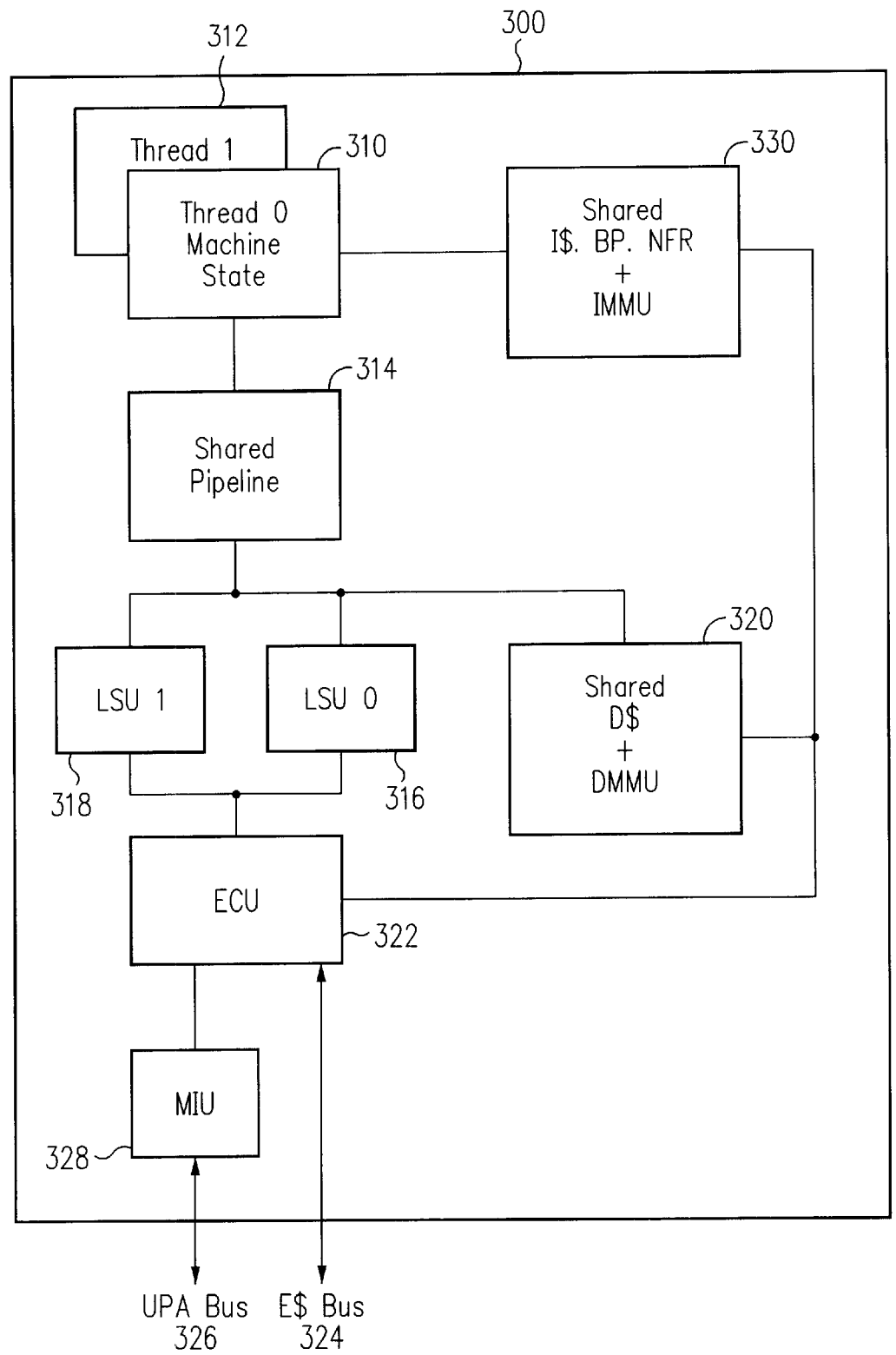
FIG. 3 is a schematic functional block diagram depicting a design configuration for a single-processor vertically-threaded processor that is suitable for implementing various multithreading techniques and system implementations that improve multithreading performance and functionality.

Referring to FIG. 3, a schematic functional block diagram depicts a design configuration for a single-processor vertically-threaded processor 300 that is suitable for implementing various multithreading techniques and system implementations that improve multithreading performance and functionality. The single-processor vertically-threaded processor 300 has a single pipeline shared among a plurality of machine states or threads, holding a plurality of machine states concurrently. A thread that is currently active, not stalled, is selected and supplies data to functional blocks connected to the pipeline. When the active thread is stalled, the pipeline immediately switches to a non-stalled thread, if any, and begins executing the-non-stalled thread.

The single-processor vertically-threaded processor 300 includes a thread 0 machine state block 310 that defines a machine state of a first thread (thread 0). The single-processor vertically-threaded processor 300 also includes a thread 1 machine state block 312 that defines a machine state of a second thread (thread 1) that "shadows" the machine state of thread 0. The thread 0 machine state block 310 and the thread 1 machine state block 312 are fabricated in a single integrated circuit logic structure using a high-speed multi-bit flip-flop design and a "four-dimensional" register file structure and supply instructions from thread 0 and thread 1 to a shared processor pipeline 314 using vertical threading. The multiple-dimensional register file employs register file structures that are replicated by N for vertical threading in combination with a three-dimensional storage circuit. The three-dimensional storage is formed by constructing a storage, such as a register file or memory, as a plurality of two-dimensional storage planes.

In response to a cache miss stall the processor 300 freezes the entire pipeline state of an executing thread in the shared processor pipeline 314. The processor 300 issues instructions manages the machine state of each thread separately and independently. The functional properties of an independent thread state are stored throughout the pipeline extending to the pipeline registers to allow the processor 300 to postpone execution of a stalling thread by freezing the active state in the pipeline, relinquish the pipeline 314 to a previously idle thread by activating the previously idle thread in the pipeline while holding the state of the newly idle thread in the pipeline, and later resume execution of the postponed stalling thread at the precise state of the stalling thread immediately prior to the thread switch.

The shared processor pipeline 314 is coupled to a dual load/store unit including a thread 0 load/store unit 316 and a thread 1 load/store unit 318 that execute load and store data accesses for instruction threads 0 and 1, respectively. The load/store units generate a virtual address of all load and store operations for accessing a data cache, decoupling load misses from the pipeline through a load buffer (not shown), and decoupling the stores through a store buffer. Up to one load or store is issued per cycle.

The shared processor pipeline 314 and the dual load/store unit are connected to a data memory interface 320 including a shared data cache and a shared data memory management unit (DMMU). The shared data cache is used to cache data for both thread 0 and thread 1 instruction sequences. In an illustrative processor 300, the data cache is a write-through non-allocating 16-kilobyte direct-mapped 32-byte line cache. The data cache is virtually-indexed and physically-tagged using a tag array that is dual-ported so that tag updates resulting from line fills do not collide with tag reads for incoming loads. Snoops to the data cache use the second tag port so that an incoming load processed without delay by the snoop. The shared data memory management unit (DMMU) manages virtual to physical address translation.

The dual load/store units are also connected to an external cache control unit (ECU) 322, which is connected to an external cache bus 324. The external cache control unit 322 is also connected to an UltraPort Architecture Interconnect (UPA) bus 326 via a memory interface unit (MIU) 328. The external cache control unit 322 and the memory interface unit (MIU) 328 are unified between thread 0 and thread 1 to perform functions of cache miss processing and interfacing with external devices to supply, in combination, a plurality of execution threads to the thread 0 machine state block 310 and the thread 1 machine state block 312 via a shared instruction control block 330. The unified external cache control unit 322 and memory interface unit (MIU) 328 include thread identifier (TID) tagging to specify and identify a transaction that is accessed via the external cache bus 324 and the UPA bus 326. In the processor 300, TID logging is only internal to the processor 300 (integrated circuit chip). Outside the integrated circuit chip, hardware interacts with the processor 300 in the manner of an interaction with a single CPU with one UPA bus, and one external cache bus interface. In contrast, software outside the integrated circuit chip interacts with the processor 300 in the manner of an interaction with two logical CPUs.

The instruction control block 330 includes an instruction (L1) cache, a branch prediction unit, NFRAM, and an instruction memory management unit (IMMU) all of which are shared between the multiple threads, thread 0 and thread 1. In an illustrative processor, the instruction cache is a 16 kilobyte two-way set-associative cache with 32-byte blocks. The instruction cache is physically indexed and physically tagged. The set is predicted as part of a "next field" so that only index bits of an address are needed to address the cache. The instruction memory management unit (IMMU) supports virtual to physical address translation of instruction program counters (PCs). To prefetch across conditional branches, dynamic branch prediction is implemented in hardware based on a two-bit history of a branch. In an illustrative processor, a next-field is associated with every four instructions in the instruction cache points to the next cache line to be fetched. Up to twelve instructions are stored in an instruction buffer and issued to the pipeline.

The external cache control unit 322 manages instruction (L1) cache and data cache misses, and permits up to one access every other cycle to the external cache. Load operations that miss in the data cache are remedied by multiple-byte data cache fills on two consecutive accesses to the external cache. Store operations are fully pipelined and write-through to the external cache. Instruction prefetches that miss the instruction cache are remedied by multiple-byte instruction cache fills using four consecutive accesses to the parity-protected external cache.

The external cache control unit 322 supports DMA accesses which hit in the external cache and maintains data coherence between the external cache and the main memory (not shown).

The memory interface unit (MIU) 328 controls transactions to the UPA bus 326. The UPA bus 326 runs at a fraction (for example, ⅓) of the processor clock.

Vertical multithreading advantageously improves processor performance in commercial application workloads which have high cache miss rates with a high miss penalty, low processor utilization (30%–50% on OLTP), and latency periods that present an opportunity to overlap execution to utilize cache miss wait times.

Vertical multithreading is also highly advantageous in sequential and parallel processing applications with frequent context switches.

Vertical multithreading does impose some costs on a processor in terms of resources used to save and restore thread states. The costs vary depending on the implementation of multithreading resources. For example, a software implementation typically incurs a time expense that negates any gain in latency. In another example, pipeline stages may be duplicated while attempting to share as many resources as possible, disadvantageously resulting in a high cost in silicon area.

An advantageous technique for implementing vertical multithreading, called a high-speed multi-bit flip-flop design, involves designing pipeline registers (flops) with multiple storage bits. The individual bits of a flip-flop are allocated to a separate thread. When a first thread stalls, typically due to a cache miss, the active bit of a flip-flop is removed from the pipeline pathway and another bit of the flip-flop becomes active. The states of the stalled thread are preserved in a temporarily inactive bit of the individual flip-flops in a pipeline stage. The high-speed multi-bit flip-flop design utilizes placement of a multiple-bit flip-flop at the end of the individual pipeline stages. The individual bits of the multiple-bit flip-flop are individually accessible and controllable to allow switching from a first thread to a second thread when the first thread stalls.

Figure 4A:
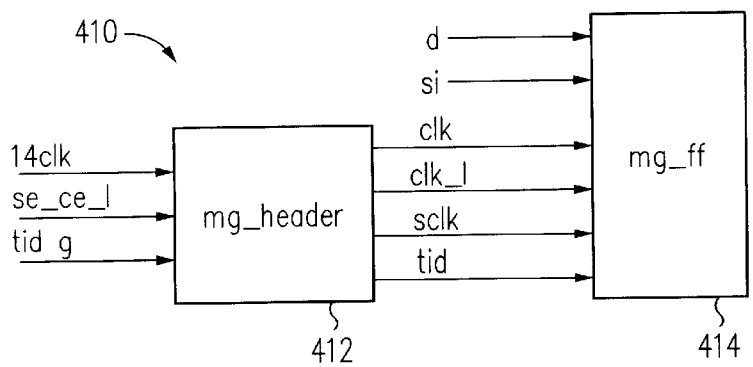
FIGS. 4A, 4B, and 4C are diagrams showing an embodiment of a pulse-based high-speed flip-flop that is advantageously used to attain multithreading in an integrated circuit.

Referring to FIG. 4A, a schematic block diagram illustrates control and storage blocks of a circuit employing high-speed multiple-bit flip-flops. A multiple-bit flip-flop storage block 410 includes a storage header block 412 and a multiple-bit flip-flop block 414. The storage header block 412 supplies timing signals and thread select signals to the multiple-bit flip-flop block 414. Input signals to the storage header block 412 include a clock signal 14clk that is supplied from external to the multiple-bit flip-flop storage block 410, a combined scan enable and clock enable signal se__ce__l, and a thread identifier (TID) signal tid__g that is supplied from thread select circuitry external to the multiple-bit flip-flop storage block 410. The storage header block 412 derives an internal flip-flop clock signal clk, the inverse of the internal flip-flop clock signal clk__l, and a scan clock signal sclk from the external clock 14clk and the scan enable and clock enable signal se__ce__l. The storage header block 412 asserts an internal thread ID signal tid based on the thread identifier (TID) signal tid__g. The storage header block 412 drives one or more flip-flop cells in the multiple-bit flip-flop block 414. Typically, the multiple-bit flip-flop block 414 includes from one to 32 bistable multivibrator cells, although more cells may be used. The internal flip-flop clock signal clk, the inverse of the internal flip-flop clock signal clk__l, the scan clock signal sclk, and the internal thread ID signal tid are supplied from the storage header block 412 to the multiple-bit flip-flop block 414.

In addition to the internal flip-flop clock signal clk, the inverse of the internal flip-flop clock signal clk__l, the scan clock signal sclk, and the internal thread ID signal tid, the multiple-bit flip-flop block 414 also receives an input signal d and a scan chain input signal si.

Figure 4B:
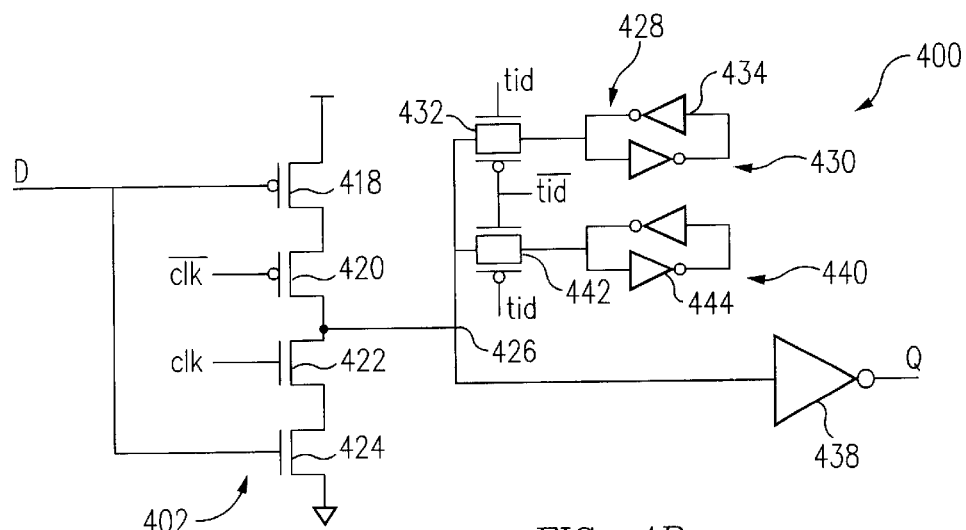

Referring to FIG. 4B, a schematic circuit diagram shows a multiple-bit bistable multivibrator (flip-flop) circuit. A conventional flip-flop is a single-bit storage structure and is commonly used to reliably sample and store data. A flip-flop is typically a fundamental component of a semiconductor chip with a single phase clock and a major determinant of the overall clocking speed of a microcontroller or microprocessor. A novel pulse-based multiple-bit high-speed flip-flop 400 is used to accelerate the functionality and performance of a processor.

An individual cell of the pulse-based multiple-bit high-speed flip-flop 400, includes an input stage with a push-pull gate driver 402. The push-pull gate driver 402 operates as a push-pull circuit for driving short-duration pulses to a multiple-bit storage circuit 428 and an output line q via an inverter 438. The push-pull gate driver 402 has four MOSFETs connected in series in a source-drain pathway between VDD and VCC references including a p-channel MOSFET 418, a p-channel MOSFET 420, an n-channel MOSFET 422, and an n-channel MOSFET 424. P-channel MOSFET 418 and n-channel MOSFET 424 have gate terminals connected to the input signal d. The p-channel MOSFET 420 has a source-drain pathway connected between the p-channel MOSFET 418 and node 426, and has a gate terminal connected to the inverse of the internal flip-flop clock signal clk_l. The n-channel MOSFET 422 has a source-drain pathway connected between the node 426 and the n-channel MOSFET 424, and a gate terminal connected to the internal flip-flop clock signal clk. When the inverse clock signal clk_l and the input signal d are simultaneously low, the node 426 is brought high by the p-channel MOSFET 418 and the p-channel MOSFET 420. When the internal flip-flop clock signal clk and the input signal d are simultaneously high, the node 426 is brought low by the n-channel MOSFET 424 and n-channel MOSFET 422. Accordingly, the short duration pulses are generated by operation of the p-channel MOSFET 420 and the n-channel MOSFET 422 that drive the sample data on input terminal d to the node 426 on assertion of the clock signal clk. When the internal flip-flop clock signal clk is asserted, the node 426 holds a value that is the inverse of the input signal d. Driving strengths of the transistors 418, 420, 422, and 424 are selected for different functionality during various conditions such as data sampling and propagation, thread switching, and scanning.

The illustrative multiple-bit storage circuit 428 includes two storage cells 430 and 440, although other embodiments may include a single storage cell or more storage cells. A storage cell 430 or 440 includes a switch 432 or 442, respectively, and a static memory element or latch 434 or 444, respectively. The switch is used to select a particular latch according to the thread identifier (TID) that is active during a short-duration clock pulse. When the internal flip-flop clock signal clk is asserted, the inverse of the input signal d is latched by the storage cell 430 or 440 that is selected by the thread identifier (TID). In the illustrative system, the storage cell 430 is latched when the TID value is 0 so that the memory element 434 holds the inverse of the input signal d. Similarly, the storage cell 440 is latched the value of input signal d when the TID value is 1. Other embodiments of a pulse-based multiple-bit high-speed flip-flop 400 may be utilized that include additional storage cells, for example using a multiple-bit TID and a plurality of switches, multiplexer, or other functionally equivalent switch to select between storage cells.

The multiple-bit storage circuit 428 is connected to the node 426 and thus connected to the data path from the node 426 to the output line q, but is not inserted into the data path between the node 426 and the output line q. Specifically, a single line forms the input terminal and the output terminal to the storage cells 430 and 440 so that the multiple-bit storage circuit 428 does not interpose a delay between the node 426 and the inverter 438. The connection of the multiple-bit storage circuit 428 outside the path of data flow prevents delay of the data signal, increasing the rate of propagation of the data signal. The resulting improvement in data transmission rate increases the amount of time available for signal computation in a computing system, improving system operating speed. In contrast, a conventional pipeline generally contains conventional storage elements or latches that are located in the path of data flow, slowing the propagation of a signal and reducing the time for signal computation in a processor, resulting in a reduction is processor execution speed.

The short-duration pulse at the node 426 activates the static memory element or latch 434, 444 selected by the TID. The latches 434 and 444 are edge-triggered for sampling data in a small time window, and can be configured for operation with both positive edges and negative edges of pulse signals. The multiple-bit pulse-based high-speed flip-flop 400 is connected to bus select lines to determine which bit is active of a plurality of bits. At any one time only a single bit is active and the active bit holds and drives an output signal on an output line q via the inverter 438. When the active bit is switched with one of the inactive bits, the output signal of the latch 434 or 444 changes accordingly.

Bits of the pulse-based high-speed flip-flop 400 may be made scannable selectively.

In one example, the high-speed flip-flop 400 is a master-slave flip-flop that replaces a single-bit master-slave flip-flop. Other types of flip-flops, which are well-known in the electronics arts may be converted to multiple-bit flip-flops for usage in a multi-threaded processor.

Figure 4C:
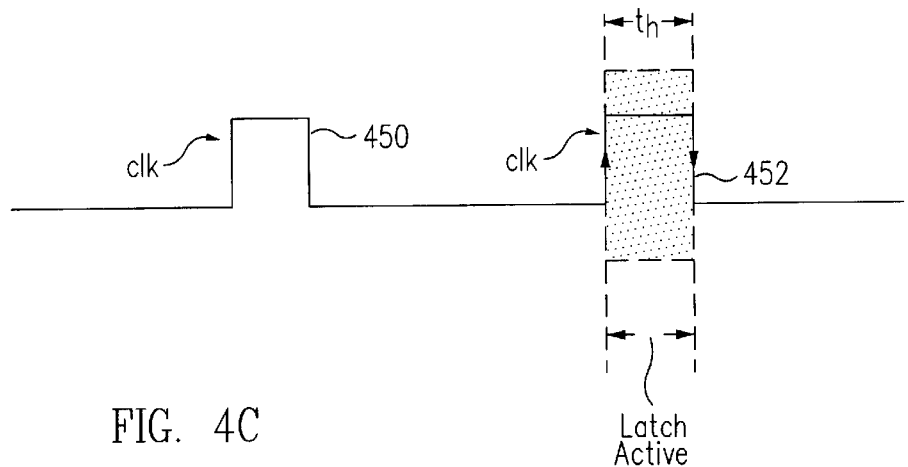

Referring to FIG. 4C, a timing diagram illustrates timing of the multiple-bit flip-flop 400. The clock and inverted clock signals clk and clk_l generate a clock pulse 450 so that data present on the input line d just before the clock transition, or "edge", determines the output state on line q after the clock has changed. The internal flip-flop clock signal clk is asserted to generate the clock pulse 450, so that the node 426 holds a value that is the inverse of the input signal d. During the clock pulse 450, the inverse of the input signal d is latched onto the storage cell 430 or the storage cell 440 as determined by the thread identifier (TID). The flip-flop 400 samples the signal in a small time-duration window to produce an edge-trigger functionality.

When the internal flip-flop clock signal clk is no longer asserted, the signal at the node 426 is determined by the storage cells 430 and 440, determined by the TID control signal. Following a suitable delay that is sufficient to for latching the sample signal at the node 426 onto the latch 434 or 444, a secondary pulse 452 is driven onto the node 426 inverted by the inverter 438 and driven to the output line q.

In the illustrative pulse-based high-speed flip-flop 400, the latches 434 and 444 are advantageously removed from the direct path of signal propagation and thus do not degrade signal speed. The pulse-based high-speed flip-flop 400 has a zero setup time but a relatively long hold time.

In contrast, a conventional flip-flop includes a storage element that is in the path of data flow, slowing propagation of the signal and shortening the time duration that is left for signal computation, thereby reducing system operating speed. The described flip-flop 400 includes a storage element that is not in the direct path of signal propagation and does not hinder system operating speed.

Figure 5:
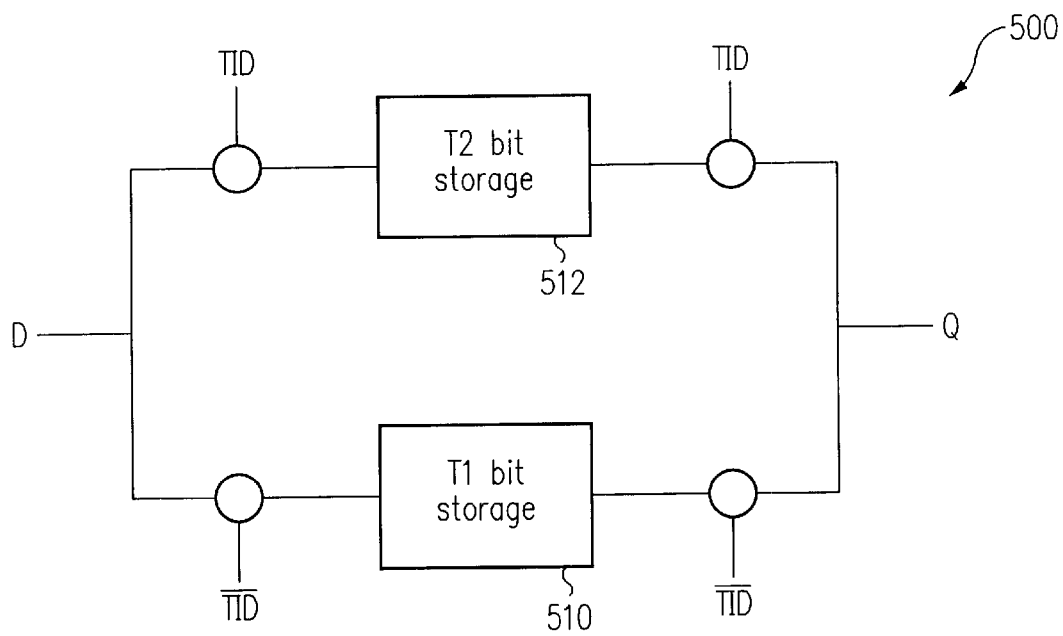
FIG. 5 is a schematic block diagram illustrating an N-bit "thread selectable" flip-flop substitution logic that is used to create vertically multithreaded functionality in a processor pipeline while maintaining the same circuit size as a single-threaded pipeline.

Referring to FIG. 5, a schematic block diagram illustrates an N-bit "thread selectable" flip-flop substitution logic 500, that is used in some multithreading system and method configurations. A processor includes an implementation of N-bit flip-flop global substitution to support multiple machine states. The processor design includes replacement of 1-bit flip-flops in logic of the stalling vertical thread to N-bit global flip-flops where N is the number of vertical threads. The flip-flop substitution logic 500 advantageously converts the single-bit flip-flop logic into multiple-bit flip-flop logic without increasing the surface area of the integrated circuit, maintaining the same footprint so that the die size of the integrated circuit remains the same while forming multiple thread data paths. The flip-flop substitution logic 500 advantageously generates the multiple thread paths without using multiplexers to select between threads. Usage of multiplexers would increase the integrated circuit area, negating the inherent advantages of the flip-flop substitution logic 500.

The N-bit "thread selectable" flip-flop substitution logic 500 is used to create vertically multithreaded functionality in a processor pipeline while maintaining the same circuit size, including area, aspect ratio, metal footprint, and terminal locations, as a single-threaded pipeline. The N-bit "thread selectable" flip-flop substitution logic 500 adds an extra bit or a plurality of extra bits of storage in each 1-bit flip-flop that is allocated for handling pipeline stalls. The N-bit "thread selectable" flip-flop substitution logic 500 is activated by a scan enable (SE) signal of a scannable flip-flop for selecting an active thread. The thread is selected based on a thread identifier (TID) signal. The illustrative N-bit "thread selectable" flip-flop substitution logic 500 depicts a two-bit substitution logic, including a T0-bit storage 510 and a T1-bit storage 512, for handling storage for two execution threads. The illustrative N-bit "thread selectable" flip-flop substitution logic 500 is a simple D flip-flop with a single-bit thread identifier (TID) selecting the T1-bit storage 512 and the inverse of the TID signal selecting the T0-bit storage 510.

In one class of processor designs, the N-bit "thread selectable" flip-flop substitution logic 500 is advantageously used to retrofit an existing single thread processor to a multithreaded configuration. Accordingly, the N-bit "thread selectable" flip-flop substitution logic 500 is employed to replace most of the standard 1-bit flip-flops in a processor with a special type of flip-flop (FF) that has multiple bits of state and is thread-selectable. In a specific application, the N-bit "thread selectable" flip-flop substitution logic 500 is used to implement a MegaSPARC multiple-thread processor from a mature UltraSPARC-II processor core design.

Each bit in the: N-bit "thread selectable" flip-flop substitution logic 500 corresponds to an individual machine state of a thread, forming what may be called a "virtual CPU". Only one bit is active at any time so that only one of a plurality of virtual CPUs occupy the pipeline at one time. When the active virtual CPU receives a data cache or instruction cache miss, the virtual CPU sends a fill request to an external cache and initiates a thread switch allowing another virtual CPU to become active.

Although the illustrative example shows an N-bit "thread selectable" flip-flop substitution logic 500 where N is two and the processor implementation handles two threads, any suitable number of bits may be implemented for the number N based on desired computing applications, as well as processing considerations in creating storage structures and switches in a specified circuit size.

In the illustrative processor, the N-bit "thread selectable" flip-flop substitution logic 500 is implemented in most, but not all of the functional components of the processor. The N-bit "thread selectable" flip-flop substitution logic 500 is implemented for flip-flops in functional components including control/status registers and pipeline stage registers. Other processor components including processor backend logic such as external cache and memory interface components may implement conventional flip-flops. The backend logic that handles cache fill requests is shared by all virtual CPUs so that multiple-bit flip-flop conversion is not necessary.

The fill request for the virtual CPU that is replaced is processed even when the virtual CPU is inactive. When data returns for the fill request, the data is buffered temporarily to be filled into the L1 cache (either data cache or instruction cache) later when the thread again becomes active. Until the replaced virtual CPU becomes active, the currently active (replacing) virtual CPU continues processing until the replacing virtual CPU encounters a thread switch, such as an L1 cache miss. Upon the occurrence of the thread switch signal terminating the replacing virtual CPU, the processor switches to another virtual CPU which is not stalled (possibly the first replaced virtual CPU). If all virtual CPUs are stalled awaiting cache misses, the pipeline is vacant and stalls until data returns for at least one virtual CPU.

For misses on an instruction fetch, the backend logic handles the instruction cache fill of an inactive virtual CPU in the same manner. To avoid a mis-speculated thread switch, a virtual CPU is not replaced until the instruction cache miss causes an empty condition of the instruction buffer.

In some vertical multithreading processor designs, vertical multithreading is advantageously implemented using a fast, for example nanosecond duration, context switch that improves performance of sequential and parallel processing applications which are subject to frequent context switching. The fast, nanosecond range context switch or thread switch is highly advantageous in comparison to conventional context switching techniques that generally take place in a time range in the order of microseconds to milliseconds, several orders of magnitude slower than the context switching described herein. The fast, nanoseconds range context switching is attained by the capability of freezing the pipeline and by passing multiple threads of data through a multiple-threaded structure that stores data for multiple threads concurrently, for example, through usage of multiple-bit flip-flops. Data of an active thread updates the data storage while data in inactive threads remains frozen. Thread switching occurs by switching thread pathways between the updating states and frozen states. In contrast, conventional context switching requires draining of the full pipeline and storing of data from the register files of a first thread into a memory and restoring data of a second thread from a memory to the register files. All are highly time-consuming operations.

In some applications context switches typically are made in response to interrupts, including hardware and software interrupts, both internal and external, of a processor. Computing applications subject to frequent context switches include disk server, network server, web server, telecommunications applications and the like.

Figure 6:
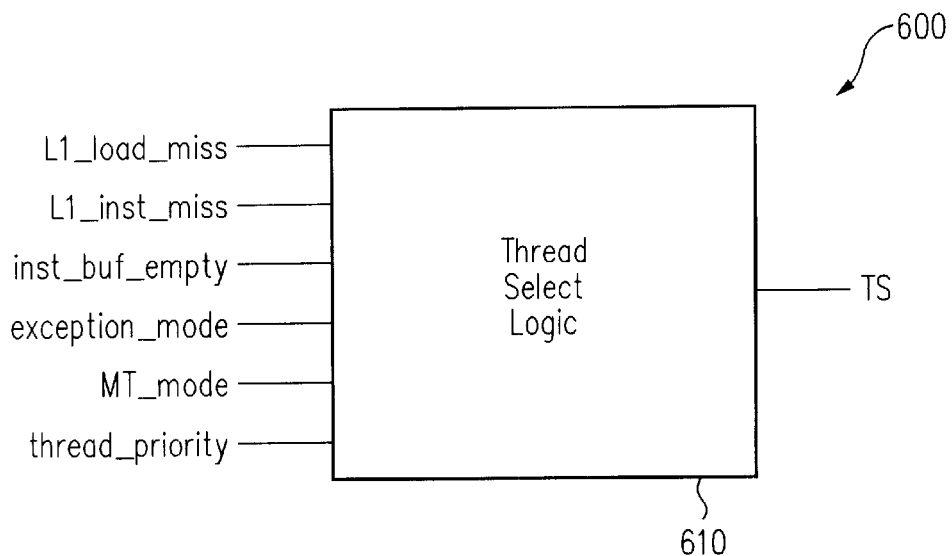
FIG. 6 is a schematic block diagram illustrating a thread switch logic which rapidly generates a thread identifier (TID) signal identifying an active thread of a plurality of threads.

In an illustrative system, the fast, nanoseconds range context switch is implemented in hardware, advantageously eliminating software overhead during saving and restoration of the processor state. Referring to FIG. 6, a schematic block diagram illustrates a thread switch logic 610 which generates a thread identifier (TID) signal identifying an active thread of a plurality of threads.

A processor includes the thread switch logic 610 to attain a very fast exception handling functionality while executing non-threaded programs by invoking a multithreaded-type functionality in response to an exception condition. The processor, while operating in multithreaded conditions or while executing non-threaded programs, progresses through multiple machine states during execution. The very fast exception handling logic includes connection of an exception signal line to thread select logic, causing an exception signal or trap to evoke a switch in thread state and machine state. The switch in thread state and machine state causes the processor to enter and to exit the exception handler immediately, without invoking typical operating system or software handling and without the inherent timing penalty of the operating system's software saving and restoring of registers. Connection of the exception line directly to the thread select logic advantageously causes an exception condition to evoke a context or thread switch that significantly reduces software or system overhead penalty.

Usage of the multi-threaded, multi-processor configuration in combination with the thread switch logic 610 and the operation of various compiler techniques accelerates the execution of sequential programs. For example, a compiler may be optimized to automatically generate speculative parallel threads in sequential, non-numeric programs. The compiler may also be optimized to speculatively move load instructions ahead of store instructions and execute the load and store instructions in separate parallel threads.

In another example, the compiler may be controlled to launch speculative parallel threads (epochs) on loop iterations with speculative execution in which branch conditions are predicted. In circumstances of unsafe speculation, the compiler may control execution to execute a plurality of threads to cover all possible branch conditions and to select results from the thread of the correct branch. In some processor implementations, two additional bits are appended to lines of the L1 data cache to store an indication of whether data in the line is speculatively loaded or speculatively stored so that nonspeculative results are rapidly retired.

Sequential programs are also made more efficient by extending an invalidation-based cache coherence protocol to compare epoch numbers of a store snoop hit condition to a speculatively-loaded cache line.

The fast, nanoseconds range context switch operates in conjunction with thread switching logic such as the pulse-based high-speed flip-flop 400 to improve speed of thread switching. The pulse-based high-speed flip-flop 400 enables virtually instantaneous switching between threads, saving of the machine state of a stalled thread, and machine state restoration of an activated thread. The fast, nanoseconds range, context switching rapidly controls which thread is activated by the pulse-based high-speed flip-flop 400. The thread switch logic 610 receives a plurality of input signals that evoke a context switch and thread switch. In an illustrative processor, input terminals to the thread switch logic 610 include an L1_load_miss terminal, an L1_instruction_miss terminal, an instruction_buffer_empty terminal, a thread_priority terminal, an MT_mode terminal, an external_interrupt terminal, and an internal_interrupt terminal. The thread switch logic 610 generates a thread identifier (TID) signal based on signals to the input terminals. The thread switch logic 610 generates the TID signal with a thread switch delay or overhead of one processor cycle.

Other processors may include other signals that generate a thread switch signal (TID). For example, some processors may be configured to switch threads on an L2 cache miss.

The thread switch logic 610 generates signals to allow the processor to switch context to another thread in response to an L1 cache load miss which pulses the L1_load miss terminal, and in response to an L1 cache instruction miss which pulses the L1_instruction_miss terminal. The thread switch logic 610 also generates signals allowing the processor to switch context to another thread when an instruction buffer is empty, generating a signal to the instruction_buffer_empty terminal. The thread switch logic 610 also switches context in response to external and internal interrupts which pulse the external_interrupt terminal and the internal_interrupt terminal, respectively.

The thread switch logic 610 permits control of thread selection based on priority of a particular thread via signals to the thread_priority terminal. The thread switch logic 610 is typically implemented as a control processor, microcontroller, microcode control logic, a logic circuit, or the like, all of which are well known in the electronics arts. Accordingly, fast thread switching upon an occurrence of an L1 cache miss may be selected.

In other applications, thread reservations may be selected on the basis of which process or context is the busiest. In these applications, the thread switch logic 610 implements a thread reservation system or thread locking system in which a thread pathway is reserved for usage by a selected thread. The thread switch logic 610 may select a particular thread that is to execute with priority in comparison to other threads. A high priority thread may be associated with an operation with strict time constraints, an operation that is frequently and predominantly executed in comparison to other threads. Thread switch logic 610 controls thread-switching operation so that a particular hardware thread is reserved for usage by the selected thread.

In one example of a priority operation, a JAVA™ server typically includes a master process and a plurality of slave processes. The thread switch logic 610 reserves a hardware thread for the master process, which determines which slave process is permitted to execute at any time. The master process is therefore selected as a reserved thread that reserves a particular reserved hardware thread and is thus locked into the reserved hardware thread. The master process continues to execute in the reserved hardware thread but allocates nonreserved hardware threads among the plurality of slave threads.

In other applications, the thread switch logic 610 may be configured to support native threads in an operating system, for example Solaris native threads may be supported in Java applications.

Thread switch logic 610 includes an MT_mode terminal supplying multithreading mode signals to select particular threads for multi-processor execution.

The thread switch logic 610 supports a fast thread switch with a very small delay, for example three cycles or less. In some multithreading system and method embodiments, a processor performs a fast thread-switching operation in response to an L1 cache miss stall.

In other implementations, the thread switch logic 610 implements one or more of several thread-switching methods. A first thread-switching operation is "oblivious" thread-switching for every N cycle in which the individual flip-flops locally determine a thread-switch without notification of stalling. The oblivious technique, typically implemented using a simple counter for counting cycles between switches, avoids usage of an extra global interconnection, such as wire or metal, between threads for thread selection.

A second thread-switching operation is "semi-oblivious" thread-switching for use with a load-use stall or "pipeline stall" signal. The pipeline stall signal operates in two capacities, first as a notification of a pipeline stall, and second as a thread select signal between threads so that, again, usage of an extra global interconnection between threads for thread selection is avoided. One suitable implementation of the semi-oblivious thread-switching technique employs a connection with a load/store unit global stall signal (lsu_stall_e) in UltraSPARC-I and UltraSPARC-II processors.

A third thread-switching operation is an "intelligent global scheduler" thread-switching in which a thread switch decision is selectively programmed, based on one or more signals. In one example an intelligent global scheduler uses signals such as: (1) an L1 data cache miss stall signal, (2) an L1 load miss signal, (3) an instruction buffer empty signal, (4) an instruction queue empty signal, (5) an L2 cache miss signal, (6) a thread priority signal, (7) a thread timer signal, (8) an interrupt signal, or other sources of triggering. In some embodiments, the thread select signal is broadcast as fast as possible, similar to a clock tree distribution. In some systems, a processor derives a thread select signal that is applied to the flip-flops by overloading a scan enable (SE) signal of a scannable flip-flop.

Figure 7A:
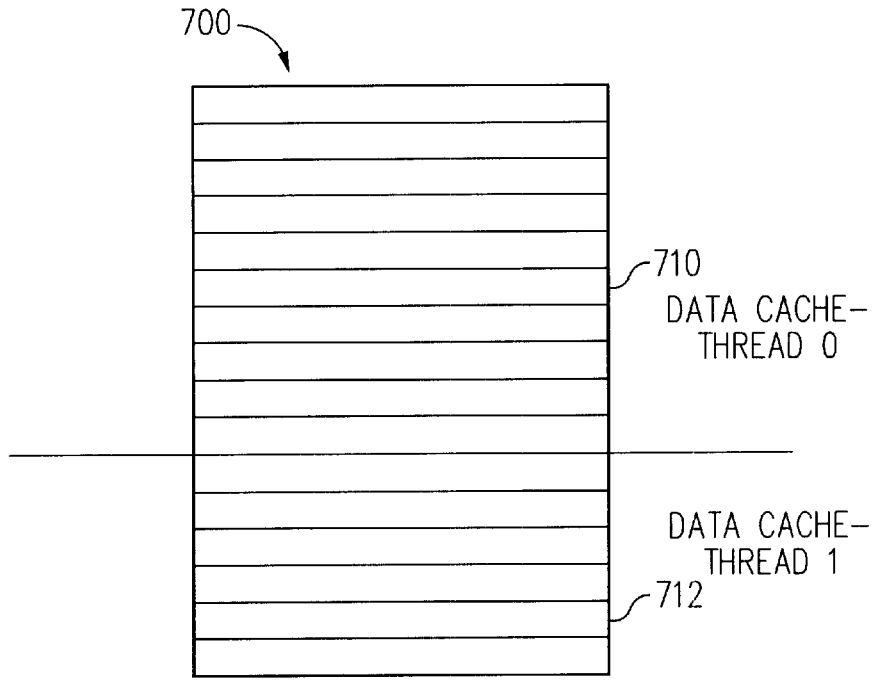
FIGS. 7A and 7B are, respectively, a schematic block diagram showing an example of a segregated cache and a pictorial diagram showing an example of an addressing technique for the segregated cache.
Figure 7B:
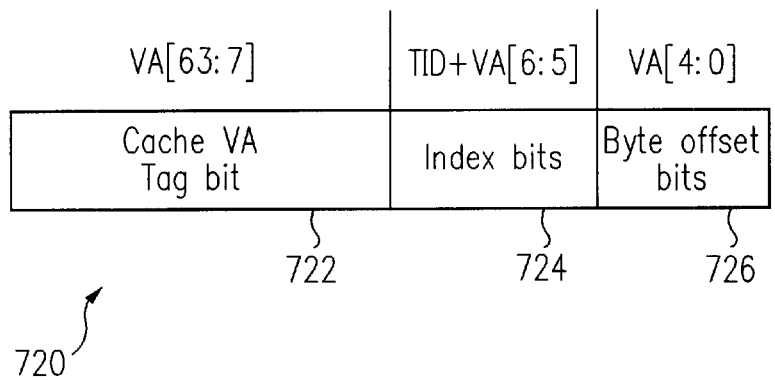

Various processor implementations include a thread switch logic 610 that segregates a cache in a processor into a plurality of N cache parts. Referring to FIG. 7A, a schematic block diagram shows an example of a cache 700 which is segregated into a first segregated cache portion 710 and a second segregated cache portion 712, each of which include a plurality of storage regions. In one example, the first segregated cache portion 710 and the second segregated cache portion 712 each have a capacity of 8 kB, segregating a 16 kB directed-mapped 32-byte line cache. Although the illustrative example shows the cache 700 segregated into two equally-sized portions, other examples may segregate a cache into any number of portions. The cache portions may be equal in size or differing in size. Referring to FIG. 7B, a pictorial diagram shows an example of an addressing technique for the segregated cache 700. A 64-bit virtual address storage 720 includes a cache virtual address tag bit field 722 with virtual address bits [63:13], a thread ID (TID) and index bits field 724 with index bits [12:5], and a byte offset bit field 726 with virtual address bits [4:0]. The index bits field 724 segregates the cache into two thread portions, the first thread segregated cache portion 710 and the second thread segregated cache portion 712.

Cache segregation is selectively applied in a single cache or a plurality of caches including L1 caches, L2 caches, external caches, and the like. Cache segregation avoids interference, "cross-talk", or "pollution" between threads. One technique for cache segregation utilizes logic for storing and communicating thread identification (TID) bits. The cache utilizes cache indexing logic. For example, the TID bits can be inserted at the most significant bits of the cache index. Sharing of an L2 cache among threads is easily-implemented since the L2 cache is physically indexed.

Figure 8:
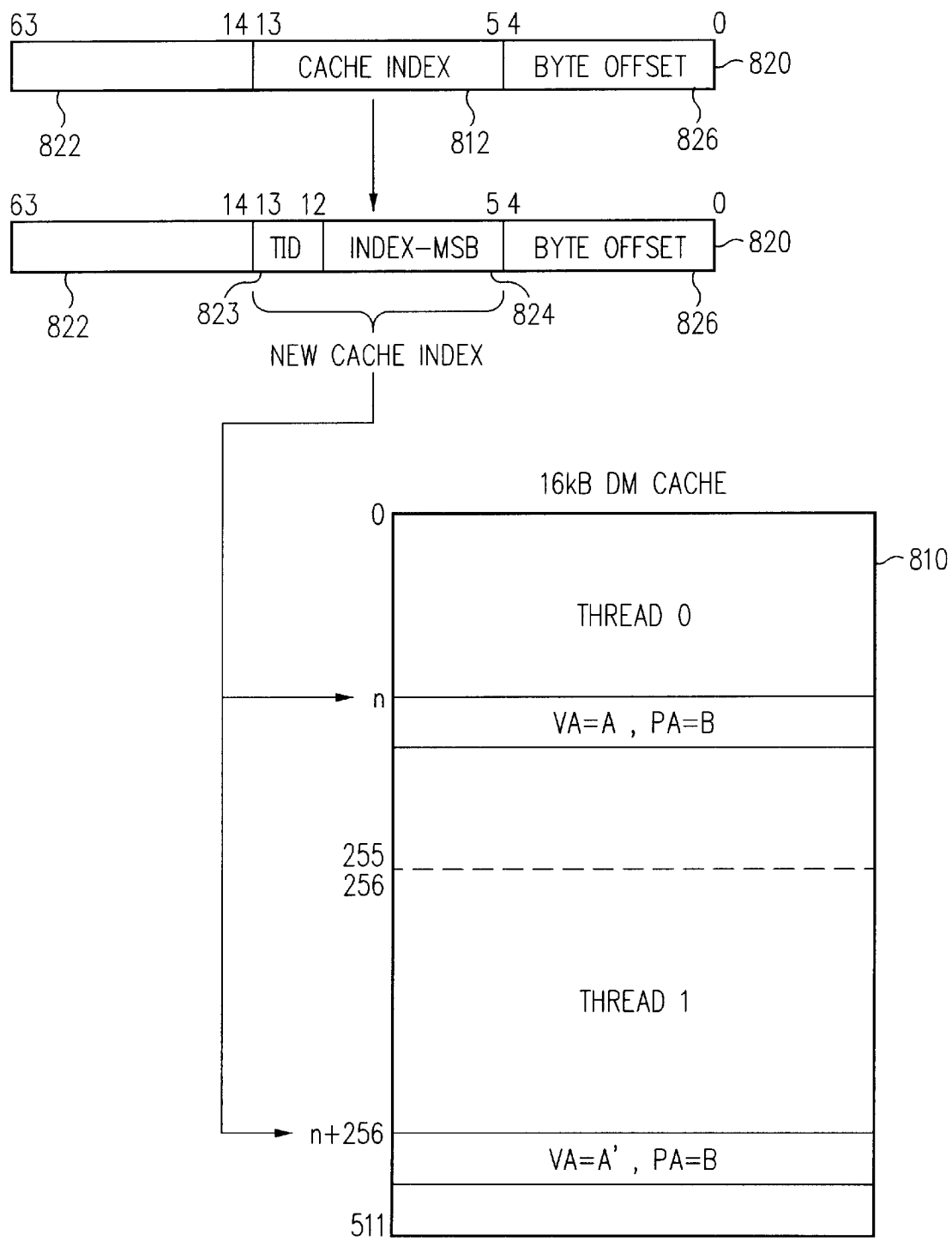
FIG. 8 is a schematic block diagram showing a suitable anti-aliasing logic for usage in various processor implementations including a cache, such as an L1 cache, and L2 cache, or others.

Various processor implementations include an anti-aliasing logic, shown in FIG. 8, which is coupled to a cache 810, such as an L1 cache, and L2 cache, or others. For example, a processor may include anti-aliasing logic coupled to an L1 cache so that the L1 cache is shared among threads via anti-aliasing. In an illustrative example, the cache is a 16 kB direct-mapped virtually-indexed, physically-tagged (VIPT) cache 810 that is shared among threads. The cache 810 is addressed using a 64-bit virtual address storage 820 including cache virtual address tag bit field 822, a cache index 812, and byte offset bit field 826. The cache index 812 is configured to include a thread ID (TID) 823 and index bits field 824.

The anti-aliasing logic stores data to the same physical address (PA), shown as PA=B, from two different threads that map to two different indexed entries n and n+256. The anti-aliasing logic operates during a store to the cache 810 by comparing the physical address at the two indexed entries. If the physical addresses match, the duplicate entry is either invalidated or updated. The anti-aliasing logic avoids hazards that result from multiple virtual addresses mapping to one physical address. The anti-aliasing logic selectively invalidates or updates duplicate L1 cache entries.

Various processor implementations include native thread logic associated with the thread switch logic 610 and the anti-aliasing logic that supports lightweight processes and native threads. The logic supporting native threads and lightweight processes includes logic that disables thread ID tagging and disables cache segregation since lightweight processes and native threads share the same virtual address space. A lightweight process is a simplified, minimal-context process or thread that is typically designed to efficiently execute kernel functions. The lightweight process has very little context so is easily and efficiently switched into and out of execution. The lightweight process thus executes efficiently without thread ID tagging and cache segregation. The thread switch logic 610 accommodates lightweight processes by disabling thread ID tagging and cache segregation, advantageously avoiding allocation of cache and other resources to threads that do not utilize the resources.

Figure 9:
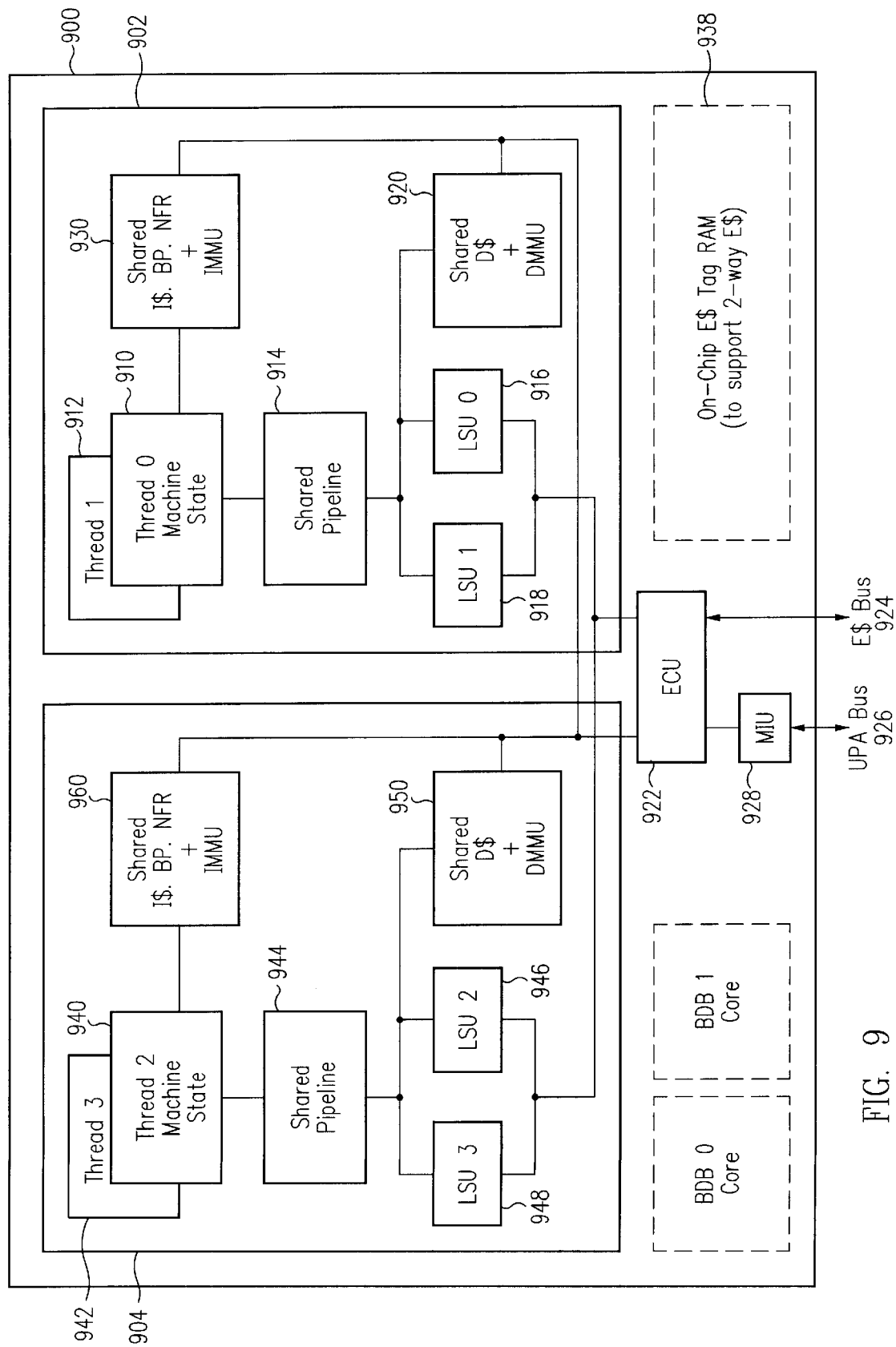
FIG. 9 is a schematic functional block diagram depicting a design configuration for a single-chip dual-processor vertically-threaded processor that is suitable for implementing various multithreading techniques and system implementations that improve multithreading performance and functionality.

Referring to FIG. 9, a schematic functional block diagram depicts a design configuration for a single-chip dual-processor vertically-threaded processor 900 that is suitable for implementing various multithreading techniques and system implementations that improve multithreading performance and functionality. The single-processor vertically-threaded processor 300 shown in FIG. 3 executes a vertical multithreading alone. In contrast, the single-chip dual-processor vertically-threaded processor 900 executes with both horizontal multithreading and vertical multithreading. The single-chip dual-processor vertically-threaded processor 900 has two processors on a single chip including a first vertical multithreading processor 902 and a second vertical multithreading processor 904.

The first vertical multithreading processor 902 includes a thread 0 machine state block 910 that defines a machine state of a first thread (thread 0) and a thread 1 machine state block 912 that defines a machine state of a second thread (thread 1) that "shadows" the machine state of thread 0. The thread 0 machine state block 910 and the thread 1 machine state block 912 have the single integrated circuit logic structure using high-speed multi-bit flip-flop design and four-dimensional register file structure, and supply instructions from thread 0 and thread 1 to a shared processor pipeline 914 using vertical threading. The shared processor pipeline 914 is connected to a dual load/store unit including a thread 0 load/store unit 916 and a thread 1 load/store unit 918 that execute load and store data accesses for instruction threads 0 and 1, respectively.

The shared processor pipeline 914 and the dual load/store unit are connected to a shared data cache and a shared data memory management unit (DMMU). The shared data cache is used to cache data for both thread 0 and thread 1 computations.

The second vertical multithreading processor 904 includes a thread 2 machine state block 940 that defines a machine state of a third thread (thread 2) and a thread 3 machine state block 942 that defines a machine state of a fourth thread (thread 3) that "shadows" the machine state of thread 2. The thread 2 machine state block 940 and the thread 3 machine state block 942 have the single integrated circuit logic structure using high-speed multi-bit flip-flop design and four-dimensional register file structure, and supply instructions from thread 2 and thread 3 to a shared processor pipeline 944 using vertical threading. The shared processor pipeline 944 is connected to a dual load/store unit including a thread 2 load/store unit 946 and a thread 3 load/store unit 948 that execute load and store data accesses for instruction threads 0 and 1, respectively.

The shared processor pipeline 944 and the dual load/store unit are connected to a shared data cache and a shared data memory management unit (DMMU). The shared data cache is used to cache data for both thread 2 and thread 3 computations.

An instruction control block 960 includes an instruction (L1) cache, a branch prediction unit, NFRAM, and an instruction memory management unit (IMMU) all of which are shared between the multiple threads, thread 2 and thread 3.

The two dual load/store units are also connected to an external cache control unit (ECU) 922, which is connected to an external cache bus 924. The external cache control unit 922 is also connected to an UltraPort Architecture Interconnect (UPA) bus 926 via a memory interface unit (MIU) 928. The external cache control unit 922 and the memory interface unit (MIU) 928 are unified between four threads, thread 0, thread 1, thread 2, and thread 3 to perform functions of cache miss processing and interfacing with external devices to supply, in combination, a plurality of execution threads to the thread 0 machine state block 910, the thread 1 machine state block 912, the thread 2 machine state block 940, and the thread 3 machine state block 942 via a shared instruction control blocks 930 and 960. The unified external cache control unit 922 and memory interface unit (MIU) 928 include thread identifier (TID) tagging to specify and identify the thread that is accessed via the external cache bus 924 and the UPA bus 926.

The unified external cache control unit 922 and memory interface unit (MIU) 928 perform operations of cache misprocessing and interfacing with external devices. Misprocessing for a thread (a virtual CPU) takes place when the thread is inactive. In addition, multiprocessing is simplified when a multithread processor operates in the manner of a single processor to an external device. Therefore, in some processors the unified external cache control unit 922 and memory interface unit (MIU) 928 are shared structures with logical enhancements to support multiple threads but do not use flip-flops to duplicate ECU and MIU functionality for each thread.

The external cache bus 924 and the UPA bus 926 interfaces are shared between threads using a single port identifier.

The external cache control unit 922 manages instruction (L1) cache and data cache misses in both the first vertical multithreading processor 902 and the second vertical multithreading processor 904, and permits up to one access every other cycle to the external cache. The external cache control unit 922 supports DMA accesses which hit in the external cache and maintains data coherence between the external cache and the main memory (not shown). The memory interface unit (MIU) 928 controls transactions to the UPA bus 926.

The single-chip dual-processor vertically-threaded processor 900 also includes an on-chip L2 cache tag RAM 938 to support a two-way external L2 cache.

The single-chip dual-processor vertically-threaded processor 900 reduces wasted cycle time resulting from stalling and idling, and increases the proportion of execution time, by supporting and implementing both vertical multithreading and horizontal multithreading. Vertical multithreading permits overlapping or "hiding" of cache miss wait times. In vertical multithreading, multiple hardware threads share the same processor pipeline. A hardware thread is typically a process, a lightweight process, a native thread, or the like in an operating system that supports multithreading, such as a Solaris UNIX operating system. Horizontal multithreading is attained by utilizing a plurality of pipelines, increasing parallelism within the processor circuit structure. The single-chip dual-processor vertically-threaded processor 900 attains vertical multithreading within a single integrated circuit die that makes up a single-chip processor. To further increase system parallelism the single-chip dual-processor vertically-threaded processor 900 executes with horizontal multithreading using multiple processor cores formed in a single die. Advances in on-chip multiprocessor horizontal threading are gained as processor core sizes are reduced through technological advancements.

The illustrative processor 900 and other multithreaded processors described herein employ thread level parallelism and operates on multiple independent threads, possibly attaining a multiplicative factor of the performance of a processor having the same resources and clock rate but utilizing traditional non-thread parallelism.

Thread level parallelism is particularly useful for Java™ applications which are bound to have multiple threads of execution. Java™ methods including "suspend", "resume", "sleep", and the like include effective support for threaded program code. In addition, Java™ class libraries are thread-safe to promote parallelism. (Java™, Sun, Sun Microsystems and the Sun Logo are trademarks or registered trademarks of Sun Microsystems, Inc. in the United States and other countries. All SPARC trademarks, including UltraSPARC I and UltraSPARC II, are used under license and are trademarks of SPARC International, Inc. in the United States and other countries. Products bearing SPARC trademarks are based upon an architecture developed by Sun Microsystems, Inc.) Furthermore, the thread model of the multithreaded processor 900 and other described multithreaded processors supports a dynamic compiler which runs as one thread while a second thread is used by the current application. In the illustrative system, the compiler applies optimizations based on "on-the-fly" profile feedback information while dynamically modifying the executing code to improve execution on each subsequent run. For example, a "garbage collector" may be executed as a first thread, copying objects or gathering pointer information, while the application is executing as a second thread.

Figure 10:
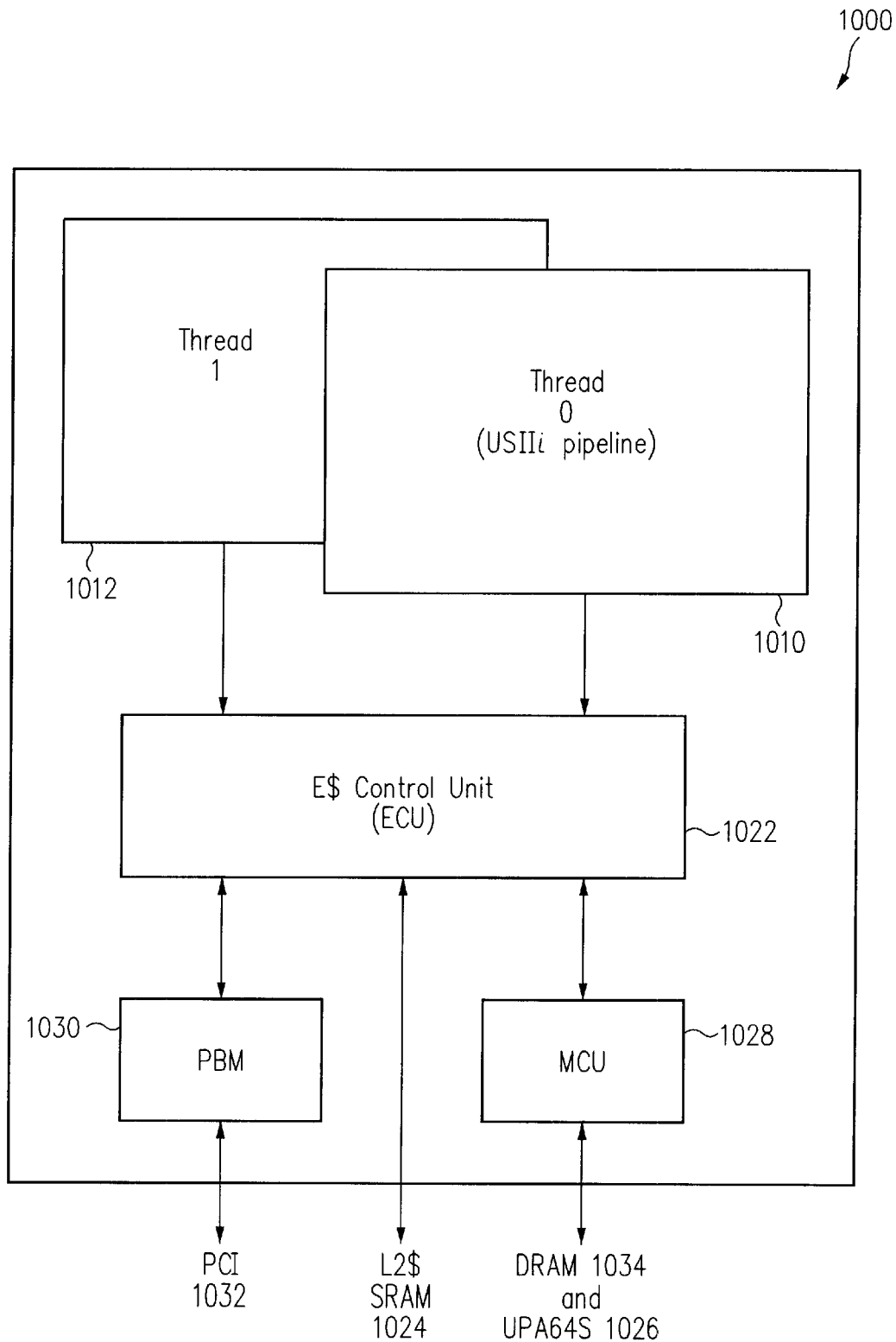
FIG. 10 is a schematic functional block diagram depicting an alternative design configuration for a single-processor vertically-threaded processor that is suitable for implementing various multithreading techniques and system implementations that improve multithreading performance and functionality.

Referring to FIG. 10, a schematic functional block diagram shows an alternative design configuration for a single-processor vertically-threaded processor 1000 that is suitable for implementing various multithreading techniques and system implementations that improve multithreading performance and functionality. The single-processor vertically-threaded processor 1000 is two-way vertically threaded with a single processor but with dual thread pipelines in a die. In an illustrative embodiment, the pipeline is based on an UltraSPARC IIi design with a peripheral component interconnect (PCI) interface and executes up to a 600 MHz processor clock frequency. The single-processor vertically-threaded processor 1000 includes a thread 0 machine state block 1010 that defines a machine state of a first thread (thread 0) and incorporates a processor pipeline. The thread 0 machine state and pipeline block 1010 is shadowed by a thread 1 machine state block 1012 that defines a machine state of a second thread (thread 1). The thread 0 machine state and pipeline block 1010 and shadow thread 1 machine state block 1012 are formed in a single integrated circuit logic structure using the previously-described high-speed multi-bit flip-flop design and a "four-dimensional" register file structure. The four-dimensional register file structure is formed in a plurality of layers of storage cells. The storage cell layers have a two-dimensional form including storage storing data bytes or words including a plurality of bits. Vertical threading introduces a fourth dimension since the three-dimensional register file is defined for a plurality of machine states that are duplicated for the registers. The multiple-dimension register file multiplicatively increases the register file storage capacity without changing the integrated circuit size since the size depends on the number and density of devices across the surface area of a semiconductor die. A suitable multiple-dimension register file is disclosed in more detail in U.S. Pat. No. 5,721,868, entitled "RAPID REGISTER FILE ACCESS BY LIMITING ACCESS TO A SELECTABLE REGISTER SUBSET", issued Feb. 24, 1998 (Yung et al) which is incorporated by reference herein in its entirety.

The multiple-dimension register file structure is highly advantageous for increasing processor performance without increasing size, and for decreasing processor size while maintaining or increasing processor performance. A further advantage of the multiple-dimension register file is that a single-threaded processor may be converted to a multi-threaded processor while maintaining the same circuit footprint size, wiring configuration, packaging, and the like. Accordingly, a multithreaded processor is advantageously produced while exploiting legacy characteristics of a single-threaded processor model.

The thread 0 machine state and pipeline block 1010 and shadow thread 1 machine state block 1012 execute instructions of thread 0 and thread 1 using vertical threading. The thread 0 machine state and pipeline block 1010 and shadow thread 1 machine state block 1012 are coupled to an external cache control unit (ECU) 1022, which is connected to an external L2 cache Static Random Access Memory (SRAM) 1024.

The external cache control unit 1022 is also connected to a peripheral component interconnect (PCI) bus 1032 via a PCI controller 1030. The external cache control unit 1022 is further connected to a Dynamic Random Access Memory (DRAM) 1034 and an UltraPort Architecture Interconnect (UPA) bus 1026 via a memory control unit (MCU) 1028. The external cache control unit 1022 and the memory control unit (MCU) 1028 are unified between thread 0 and thread 1 to perform functions of cache miss processing and interfacing with external devices to supply, in combination, a plurality of execution threads to the thread 0 machine state block 1010 and the thread 1 machine state block 1012. The unified external cache control unit 1022 and memory control unit (MCU) 1028 include thread identifier (TID) tagging to specify and identify the thread that is accessed via the L2 cache SRAM 1024, the PCI bus 1032, the DRAM 1034, and the UPA bus 1026. The PCI controller 1030 and the MCU 1028 are shared between threads using a single part identifier. Thread ID tagging is implemented in processor components that are non-stalling including, for example, a carry (logN)-bit TID in L1 and L2 caches (both data and instruction caches), translation look-aside buffers (TLBs), asynchronous interfaces of load buffers, an external memory management unit (MMU) interface, and the like. In non-stalling components, only a single thread passes through the component at one time so that no stalled state exists that would be stored. The thread ID bits identify which thread is active in the component.

The external cache control unit 1022 manages instruction (L1) cache and data cache misses, and permits up to one access every other cycle to the external cache. Load operations that miss in the data cache are remedied by multiple-byte data cache fills on two consecutive accesses to the external cache. Store operations are fully pipelined and write-through to the external cache. Instruction prefetches that miss the instruction cache are remedied by multiple-byte instruction cache fills using four consecutive accesses to the parity-protected external cache.

The external cache control unit 1022 supports DMA accesses which hit in the external cache and maintains data coherence between the external cache and the main memory (not shown).

The memory control unit (MCU) 1028 controls transactions to the UPA bus 1026 and the DRAM 1034. The UPA bus 1026 runs at a fraction (for example, ⅓) of the processor clock.

An illustrative single-processor vertically-threaded processor 1000 is constructed on a die smaller than 100 mm$^2$ and has a power dissipation of less than 10 W at a clock rate of 200 MHz. The illustrative single-processor vertically-threaded processor 1000 has an estimated gain in computational efficiency of 30% over a single-thread processor having similar performance specifications per thread.

Figure 11:
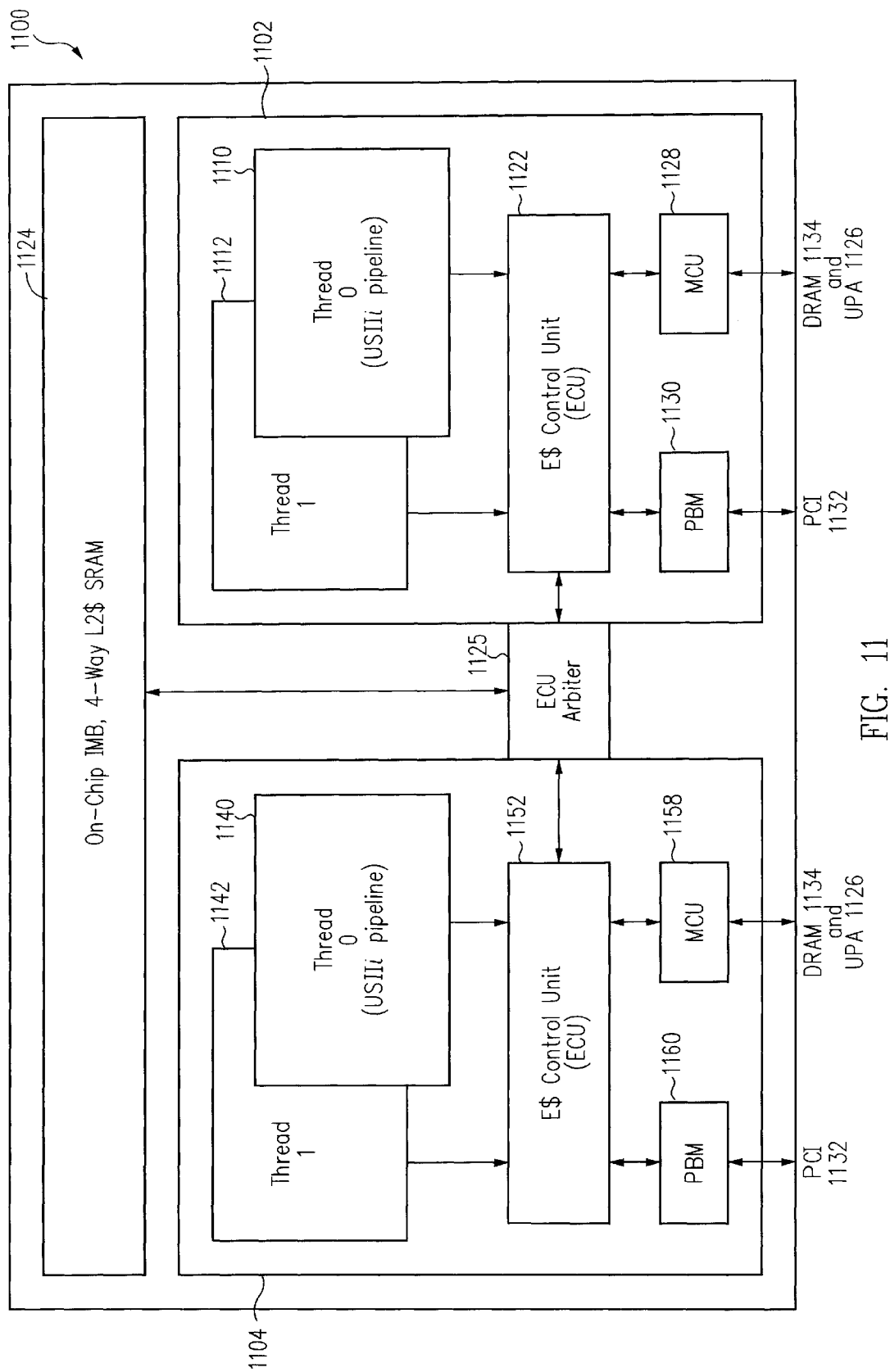
FIG. 11 is a schematic functional block diagram depicting an alternative design configuration for a single-chip dual-processor vertically-threaded processor that is suitable for implementing various multithreading techniques and system implementations that improve multithreading performance and functionality.

Referring to FIG. 11, a schematic functional block diagram illustrates an alternative design configuration for a single-chip dual-processor vertically-threaded processor 1100 that is suitable for implementing various multithreading techniques and system implementations that improve multithreading performance and functionality. The single-chip dual-processor vertically-threaded processor 1100 includes two processor cores on a single die with each processor core being two-way vertically threaded, effectively forming four processors on one die. The two processor cores share an on-chip four-way set-associative L2 cache, and share an external cache control unit that controls access of the L2 cache. Sharing of the on-chip L2 cache advantageously attains cache coherency among the plurality of processors on a single die. In the illustrative single-chip dual-processor vertically-threaded processor 1100, each of the two processor cores includes separate peripheral component interconnect (PCI), DRAM, and UltraPort Architecture Interconnect (UPA) interfaces.

The single-chip vertically-threaded processor 1000 shown in FIG. 10 executes a vertical multithreading alone. In contrast, the single-chip dual-processor vertically-threaded processor 1100 executes with both horizontal multithreading and vertical multithreading. The single-chip dual-processor vertically-threaded processor 1100 has two processors on a single chip including a first vertical multithreading processor 1102 and a second vertical multithreading processor 1104, both of which are two-way vertically threaded with a single processor but having dual thread pipelines in a die. In an illustrative embodiment, the pipelines are based on an UltraSPARC IIi design with a peripheral component interconnect (PCI) interface and executes up to a 600 MHz processor clock frequency.

The first vertical multithreading processor 1102 includes a thread 0 machine state block 1110 that defines a machine state of a first thread (thread 0) and incorporates a processor pipeline. The thread 0 machine state and pipeline block 1110 is shadowed by a thread 1 machine state block 1112 that defines a machine state of a second thread (thread 1). The thread 0 machine state and pipeline block 1110 and shadow thread 1 machine state block 1112 are formed in a single integrated circuit logic structure covering about half a semiconductor die and using the previously-described high-speed multi-bit flip-flop design and a "four-dimensional" register file structure. In some processors, the register file may be allocated to a single vertical multithreading processor. In other processors, the register file may be shared among a plurality of vertical multithreading processors.

The thread 0 machine state and pipeline block 1110 and shadow thread 1 machine state block 1112 execute instructions of thread 0 and thread 1 using vertical threading. The thread 0 machine state and pipeline block 1110 and shadow thread 1 machine state block 1112 are coupled to an external cache control unit (ECU) 1122, which is connected to an on-chip L2 cache SRAM 1124 via an external cache control unit (ECU) arbiter 1125. The L2 cache SRAM 1124 and the ECU arbiter 1125 are shared between the first vertical multithreading processor 1102 and the second vertical multithreading processor 1104. In an illustrative processor 1100, the L2 cache SRAM 1124 is a 1 Megabyte, four-way L2 cache.

The external cache control unit 1122 is also connected to a peripheral component interconnect (PCI) bus 1132 via a PCI controller 1130. The external cache control unit 1122 is further connected to a DRAM 1134 and an UltraPort Architecture Interconnect (UPA) bus 1126 via a memory control unit (MCU) 1128. The external cache control unit 1122 and the memory control unit (MCU) 1128 are unified between thread 0 and thread 1 to perform functions of cache miss processing and interfacing with external devices to supply, in combination, a plurality of execution threads to the thread 0 machine state block 1110 and the thread 1 machine state block 1112. The unified external cache control unit 1122 and memory control unit (MCU) 1128 include thread identifier (TID) tagging to specify and identify the thread that is accessed via the L2 cache SRAM 1124, the PCI bus 1132, the DRAM 1134, and the UPA bus 1126. The PCI controller 1130 and the MCU 1128 are shared between thread 0 and thread 1 using a single port identifier.

The external cache control unit 1122 manages instruction (L1) cache and data cache misses, and permits up to one access every other cycle to the external cache. Load operations that miss in the data cache are remedied by multiple-byte data cache fills on two consecutive accesses to the external cache. Store operations are fully pipelined and write-through to the external cache. Instruction prefetches that miss the instruction cache are remedied by multiple-byte instruction cache fills using four consecutive accesses to the parity-protected external cache.

The external cache control unit 1122 supports DMA accesses which hit in the external cache and maintains data coherence between the external cache and the main memory (not shown).

The memory control unit (MCU) 1128 controls transactions to the UPA bus 1126 and the DRAM 1134. The UPA bus 1126 runs at a fraction (for example, ⅓) of the processor clock.

The second vertical multithreading processor 1104 includes a thread 2 machine state block 1140 that defines a machine state of a third thread (thread 2) and incorporates a processor pipeline. The thread 2 machine state and pipeline block 1140 is shadowed by a thread 3 machine state block 1142 that defines a machine state of a fourth thread (thread 3). The thread 2 machine state and pipeline block 1140 and shadow thread 3 machine state block 1142 are formed in a single integrated circuit logic structure covering about half a semiconductor die and using the previously-described high-speed multi-bit flip-flop design and a "four-dimensional" register file structure. The thread 2 machine state and pipeline block 1140 and shadow thread 3 machine state block 1142 execute instructions of thread 2 and thread 3 using vertical threading. The thread 2 machine state and pipeline block 1140 and shadow thread 3 machine state block 1142 are coupled to an external cache control unit (ECU) 1152, which is connected to the on-chip L2 cache SRAM 1124 via the external cache control unit (ECU) arbiter 1125. The L2 cache SRAM 1124 and the ECU arbiter 1125 are shared between the first vertical multithreading processor 1102 and the second vertical multithreading processor 1104.

The external cache control unit 1152 is also connected to the peripheral component interconnect (PCI) bus 1132 via a PCI controller 1160. The external cache control unit 1152 is further connected to a DRAM 1164 and the UltraPort Architecture Interconnect (UPA) bus 1126 via a memory control unit (MCU) 1158. The external cache control unit 1152 and the memory control unit (MCU) 1158 are unified between thread 2 and thread 3 to perform functions of cache miss processing and interfacing with external devices to supply, in combination, a plurality of execution threads to the thread 2 machine state block 1140 and the thread 3 machine state block 1142. The unified external cache control unit 1152 and memory control unit (MCU) 1158 include thread identifier (TID) tagging to specify and identify the thread that is accessed via the L2 cache SRAM 1124, the PCI bus 1132, the DRAM 1134, and the UPA bus 1126. The TID is supported by logic for usage with processor blocks that are not stalled. Pertinent non-stalling blocks include caches, translation look-aside buffers (TLB), a load buffer asynchronous interface, a store buffer asynchronous interface, an external memory management unit (MMU) interface, and others. The PCI controller 1160 and the MCU 1158 are shared between thread 2 and thread 3 using a single port identifier.

The load buffer and store buffer interfaces are shared structures which are implemented to maintain compatibility with multiple threads. Upon a thread switch, a new thread does not change the state of a shared structure in a manner that is incompatible with the replaced thread. The load buffer and store buffer interfaces maintain thread compatibility by physical duplication of structures and by checking read-after-write status of the storages. In particular, load operations are checked against a store buffer in an alternative thread so that read-after-write status information is stored and augmented to store results of read-after-write checks against all store buffers.

Store buffer data cache hit bits are not reset. Therefore, following a thread switch, a load in thread 2 can replace a line that is a destination of an as yet incomplete store in thread 1. Since the store buffer data cache hit bits are not reset, another thread switch can result in the thread 1 store writing to a different line. The read-after-write check on the other store buffer prevents the load from progressing ahead of stores in the other store buffer and prevents replacing of a line that is a destination of an incomplete store.

In addition, if a store in thread 1 writes the data cache but not the external cache, in the absence of a read-after-write check on the other store buffer, a load in thread 2 can receive the updated value before the other processors in the system, resulting in a TSO violation. Therefore, the data cache write complete notification for a store operation should not disable a read-after-write across threads.

The external cache control unit 1152 manages instruction (L1) cache and data cache misses, and permits up to one access every other cycle to the external cache. The external cache control unit 1152 supports DMA accesses which hit in the external cache and maintains data coherence between the external cache and the main memory (not shown).

The memory control unit (MCU) 1158 controls transactions to the UPA bus 1126 and the DRAM 1134.

An illustrative single-chip dual-processor vertically-threaded processor 1100 executes at a clock frequency of up to 600 MHz, is constructed on a die smaller than 250mm$^2$, and has a power dissipation of less than 10 W at a clock rate of 200 MHz. The illustrative single-chip dual-processor vertically-threaded processor 1100 has an estimated gain in computational efficiency of 130% over a single-thread processor having similar performance specifications per thread.

Countless other structures and combinations may be implemented on one or more integrated circuit dies depending on the fabrication process employed and the applications envisioned for the processor. The other processor configurations may be configured with varying numbers of on-chip or off-chip processor cores, varying numbers of vertical threads per pipeline, and different configurations of interfaces, memory and I/O control units, storage devices, and the like. For example, in a "1C2T" configuration, a single processor die includes two vertical threads. In another example, one advantageous configuration includes four processor cores with each core vertically multithreaded to produce a square-shaped die. In a "4C4T" configuration, a four-processor multiprocessor is formed on a single die with each of the four processors being four-way vertically threaded. An operating system controls operations of the 4C4T configuration processor as a 16-way sequential multiprocessor.

Some processors may include either on-chip or external Resettable Dynamic RAM (RDRAM) in place of an external cache. Various processors may or may not include an on-chip L2 cache. Various systems may include caches that are selectively configured, for example as segregated L1 caches and segregated L2 caches, or segregated L1 caches and shared L2 caches, or shared L1 caches and shared L2 caches.

Figure 12:
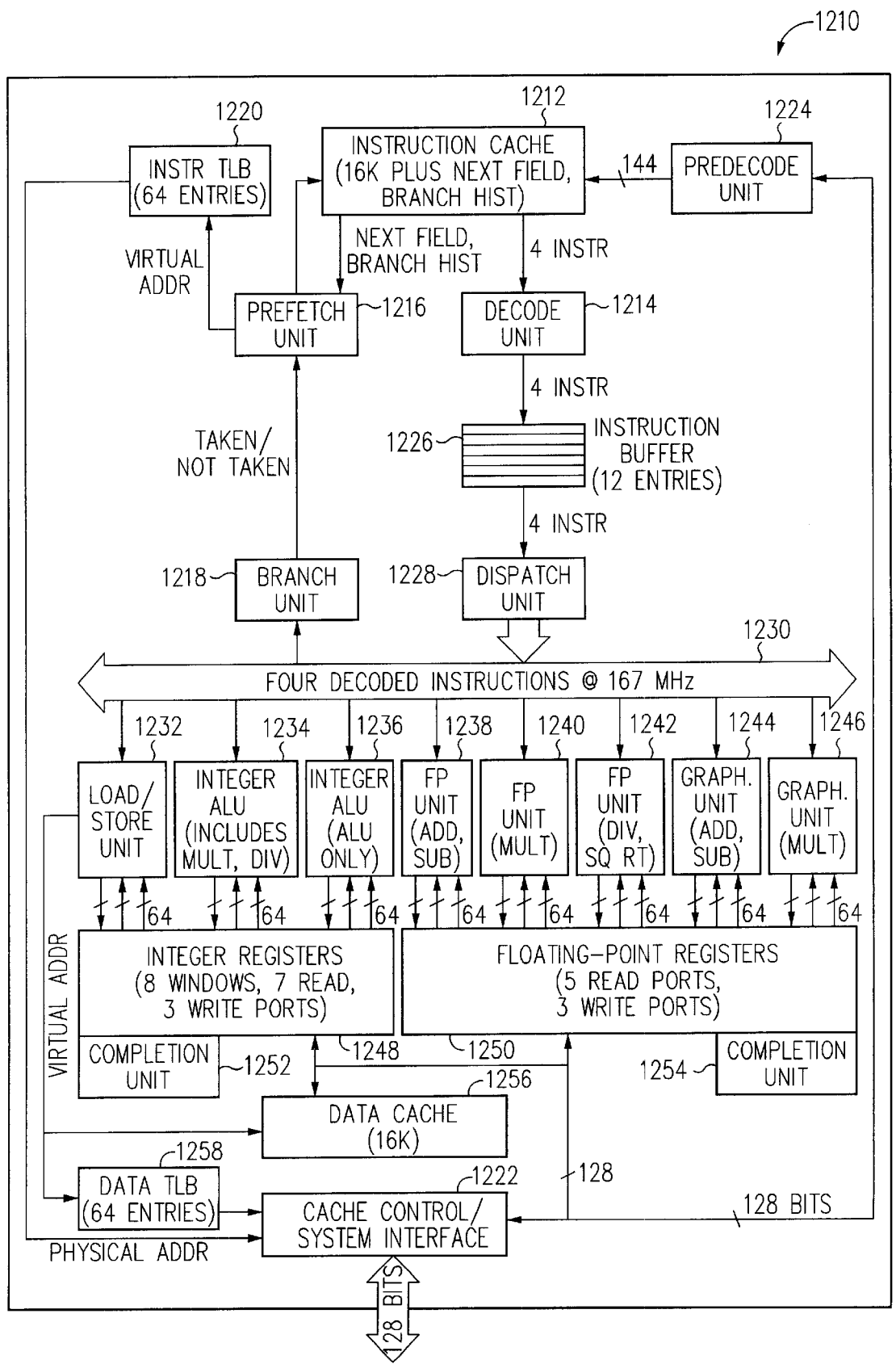
FIG. 12 is a schematic block diagram illustrating a processor and processor architecture that are suitable for implementing various multithreading techniques and system implementations that improve multithreading performance and functionality.

Referring to FIG. 12, a schematic block diagram illustrates a processor 1200 and processor architecture that are suitable for implementing various multithreading techniques and system implementations that improve multithreading performance and functionality. An instruction cache 1212 supplies instructions to a decode unit 1214. The instruction cache 1214 receives instructions from a prefetch unit 1216 that is supplied with instructions from either a branch unit 1218 or an external cache (not shown) via a cache control/system interface 1222. In some processors the cache control/system interface 1222 includes an external cache control unit (ECU) and a memory interface unit (MUI). Instructions from the external cache are supplied when the prefetch unit 1216 supplies a virtual address to an instruction translation look-aside buffer (TLB) 1220. Instructions from the external cache are supplied to a predecode unit 1224 and contain various control information to the instruction cache 1212. The various control information includes signals such as a designation that an instruction is a branch instruction.

Instructions from decode unit 1214 are supplied to an instruction buffer 1226 and accessed by dispatch unit 1228. In some processors instruction buffering is supplied by multiple instruction buffers 1226 connected in parallel. In the illustrative processor 1200, the dispatch unit 1228 supplies four decoded instructions at one time on a bus 1230. The instructions are supplied to one of eight functional units. The dispatch unit 1228 checks for data dependencies, control dependencies and structural hazards, such as availability of functional units and memory ports. The dispatch unit 1228 then, based on results of the checking operation, dispatches up to four instructions in a cycle. Integer-type functional units, including a load/store unit 1232, a first integer arithmetic logic unit (ALU) 1234, and a second integer ALU unit 1236, share a set of integer registers 1248. Floating-point-type functional units, including a first floating-point unit 1238, a second floating-point unit 1240, a third floating point unit 1242, a first graphical unit 1244, and a second graphical unit 1246 share floating-point registers 1250. The integer functional units share an integer completion unit 1252 and the floating point functional units share a floating point completion unit 1254. The processor 1200 also includes an on-chip data cache 1256 and a data translation look-aside buffer (TLB) 1258.

Figure 13:
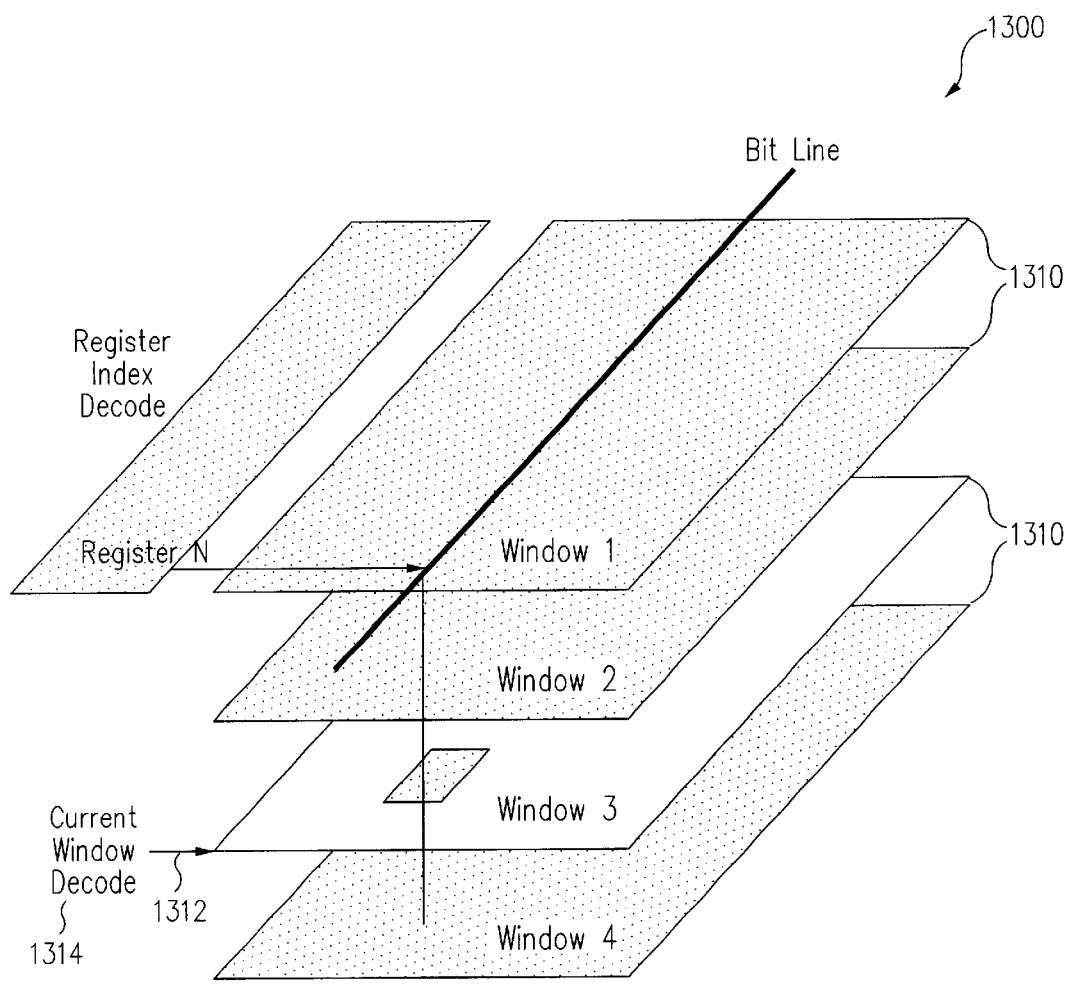
FIG. 13 is a schematic perspective diagram showing a multi-dimensional register file.

Referring to FIG. 13, a schematic perspective diagram shows a multi-dimensional register file 1300 that is advantageous for usage in a multithreaded processor. Both integer and floating point register files are typically not implemented with flip-flops so that the described multiple-bit flip-flop is not useful in the typical register file to increase the storage capacity. However, the capacity of the register files may otherwise be expanded using other techniques and structures, such as the multi-dimensional register file 1300 structure.

A register file is a datapath component that is highly determinative of performance in a superscalar processor. The access time of the register file is a factor that impacts processor cycle time. The register file consumes a relatively large portion of the superscalar processor since a large number of ports is very useful in such processors. Typically ten or more ports are used for a three-scalar microprocessor and the size of the register file increases as a quadratic function of the number of ports.

The multi-dimensional register file 1300 advantageously uses the area inherently consumed by the metal wires used for bitlines and wordlines for each storage cell to hold N sets of registers. The individual sets of the N sets is logically a plane in the third dimension. The configuration of multiple planes is used to create a plurality of register windows and to form extra register sets for real-time tasks, microtask switching, or storage for multiple execution threads. In some storages, a data array of a three-dimensional, eight-window, ten-ported register file is six times smaller than a flat register file. Access time is improved by shortening bus lines and by sharing a large buffer between bit cells. The multi-dimensional register file 1300 is advantageously implemented in high-performance superscalar microprocessors.

The large number of registers and increased functionality of a register file that includes a plurality of register windows are conventionally implemented in a microprocessor at the expense of a large increase in circuit size, cost, and difficulty in implementation. For example, for a conventional register file having a window of 32 registers with eight overlapping registers between windows would contain a total of 128 registers, not including global registers, and would be several times larger than conventional register files without windows. The functionality added by windows plus the larger number of registers make the implementation of a register file with windows challenging since RISC processors tend to base cycle time, through heavy pipelining, on basic datapath blocks such as the register file, ALUs, and caches. A conventional register file with windows implemented in a conventional way has exactly one window active for all reads and one window active for all writes.

The multi-dimensional register file 1300 exploits the fact that not all windows need to be accessed simultaneously to conserve circuitry among windows. The individual planes 1310 in the multi-dimensional register file 1300 represent a separate window. For sake of simplicity, the multi-dimensional register file 1300 is shown with four non-overlapping windows. The concept of the multi-dimensional register file 1300 applies to the support of context switching so that the individual planes 1310 represent a separate context. Context switching between microtasks is rapidly accomplished by simply changing the context number, as shown in FIG. 13 as changing the window pointer 1312.

The current context number or window pointer 1312 is decoded through a separate decoder 1314 and a corresponding plane 1310 is selected. The register index for the selected window is decoded in the manner of a conventional register file. Upon selection of a register, the register contents are driven on a data bus that is shared by all windows or contexts. For sake of simplicity, FIG. 13 only shows a read portion of the logic for the multi-dimensional register file 1300. Write logic (not shown) includes a separate decoder (not shown) for a write window pointer which selects a different plane 1310. Separate data lines are inherently included for single phase pipelines, so no additional lines need be included for the separate write window port. Note that an additional window decode line may be added to attain a higher performance.

Figure 14:
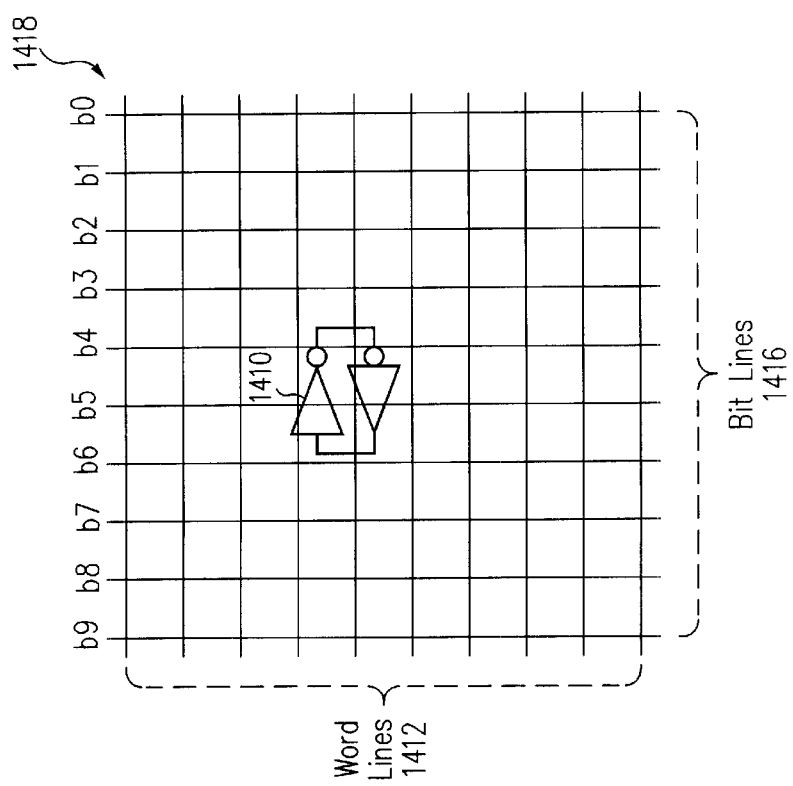
FIG. 14 is a schematic circuit diagram showing a conventional implementation of register windows.

A conventional implementation of register windows in a register file results in a large flat configuration. For a superscalar processor with multiple ports, the conventional implementation results in having a single bit of information wastefully stored beneath several metal wires. FIG. 14 is a schematic circuit diagram showing a bit cell 1410 of a conventional implementation of register windows of a register file with ten ports including seven read ports and three write ports. Ten separate word lines 1412, seven single-ended sense-amplifier lines (not shown) for the read lines and three single-ended write bit lines 1416 are included, resulting in a 10×10 grid 1418. For a four-layer metal process, the word lines are typically on the second layer and the bit lines are on the third layer. Power and ground potentials are routed on the fourth layer and the first layer is used for local connections in the bit cells. For an 0.5 micron process with a metal pitch of 1.5 micron, the 10×10 grid 1418 results in an area of 225 square microns. Beneath the 10×10 grid 1418, a single bit of information is stored, a poor utilization of the available area for logic devices. For double-sensed sense amplifiers and differential writes, the wasted area is even larger. A grid of 10×20 is typically required, resulting in an effective area of 450 microns to store a single bit of information.

The data array of a windowed register file with 128 64-bit registers implemented in the illustrative conventional manner approximately measures 128*64*225=1.84 square millimeters for the single-ended scheme and 128*64*450=3.68 square millimeters for the double-ended configuration. For a 64-bit superscalar processor with a relatively large register file, for example, 32 registers, the data array represents approximately two-thirds of the total area of the register file.

Figure 15:
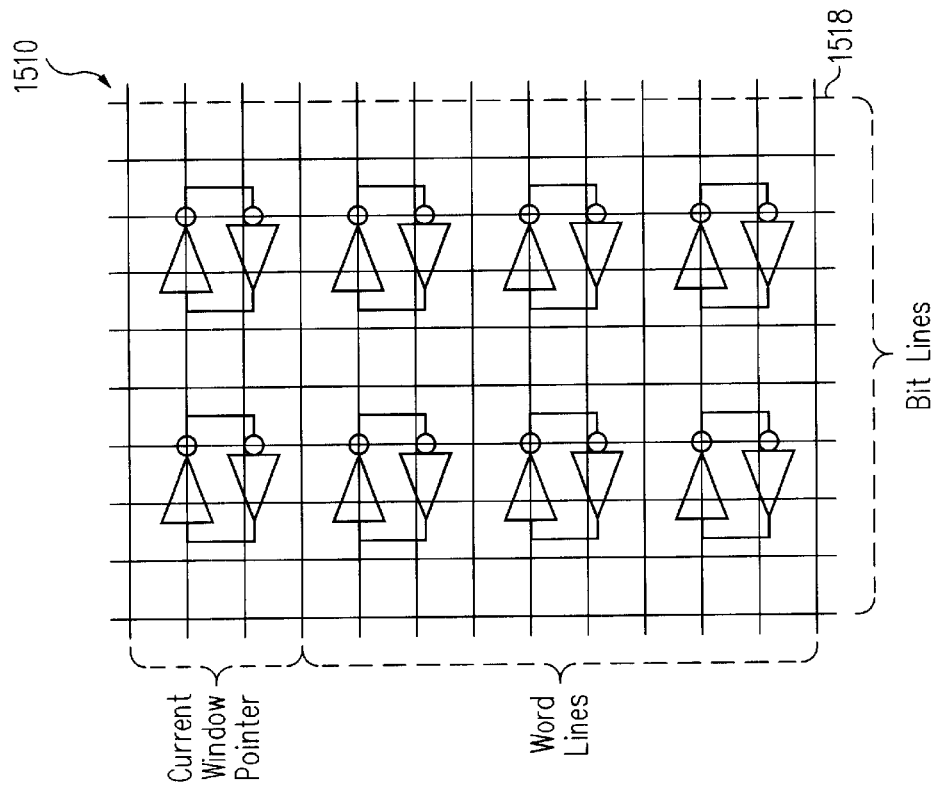
FIG. 15 is a schematic circuit diagram showing a plurality of bit cells of a register windows of the multi-dimensional register file that avoids waste of integrated circuit area by exploiting the condition that only one window is read and only one window is written at one time.

Referring to FIG. 15, a schematic circuit diagram showing a plurality of bit cells 1510 of a register windows of the multi-dimensional register file 1300 that avoids waste of integrated circuit area by exploiting the condition that only one window is read and only one window is written at one time. The otherwise wasted area is used to store bits of information of a plurality of windows at a corresponding plurality of depths at one lateral position in the integrated circuit area. For example, bit i of a register j for a plurality of windows {0, 1, 2, . . . , 7} is stored at one position in a 10×10 grid 1518 at a plurality of depths. The multiple bits at a plurality of depths are addressed by specifying a bit i, register j, and window k. Thus an eight-window register file is addressed using three additional lines for specifying a selected one of eight windows. Thus the 10×10 grid 1518 is addressed by supplying three address lines in addition to the address lines for addressing a 10×10 single-window register file. Accordingly, the 10×10 grid 1518 is addressed by 13×10 addressing lines. In the illustrative multi-dimensional register file 1300, eight bits of information are stored, rather than a single bit of information, in an area only 30% larger than the area for a single-window 10×10 grid 1418.

For a single-ended register file storage example, each bit utilizes about 36 square microns (6.15 times smaller) in comparison to the 225 square microns in a conventional single-window implementation. The benefits are even greater for a double-ended implementation in which a bit uses about 73 square microns in comparison to the 450 square microns of a conventional double-windowed storage. The double-ended storage attains the same ratio of savings, 6.15 times smaller, but results in an even larger gain in total saved area.

The 10×10 grid 1518 is shown for illustrative purposes only. A grid may have any suitable dimension (for example 10×20 or others), depending on a desired application, functionality, and capacity.

Figure 16A:
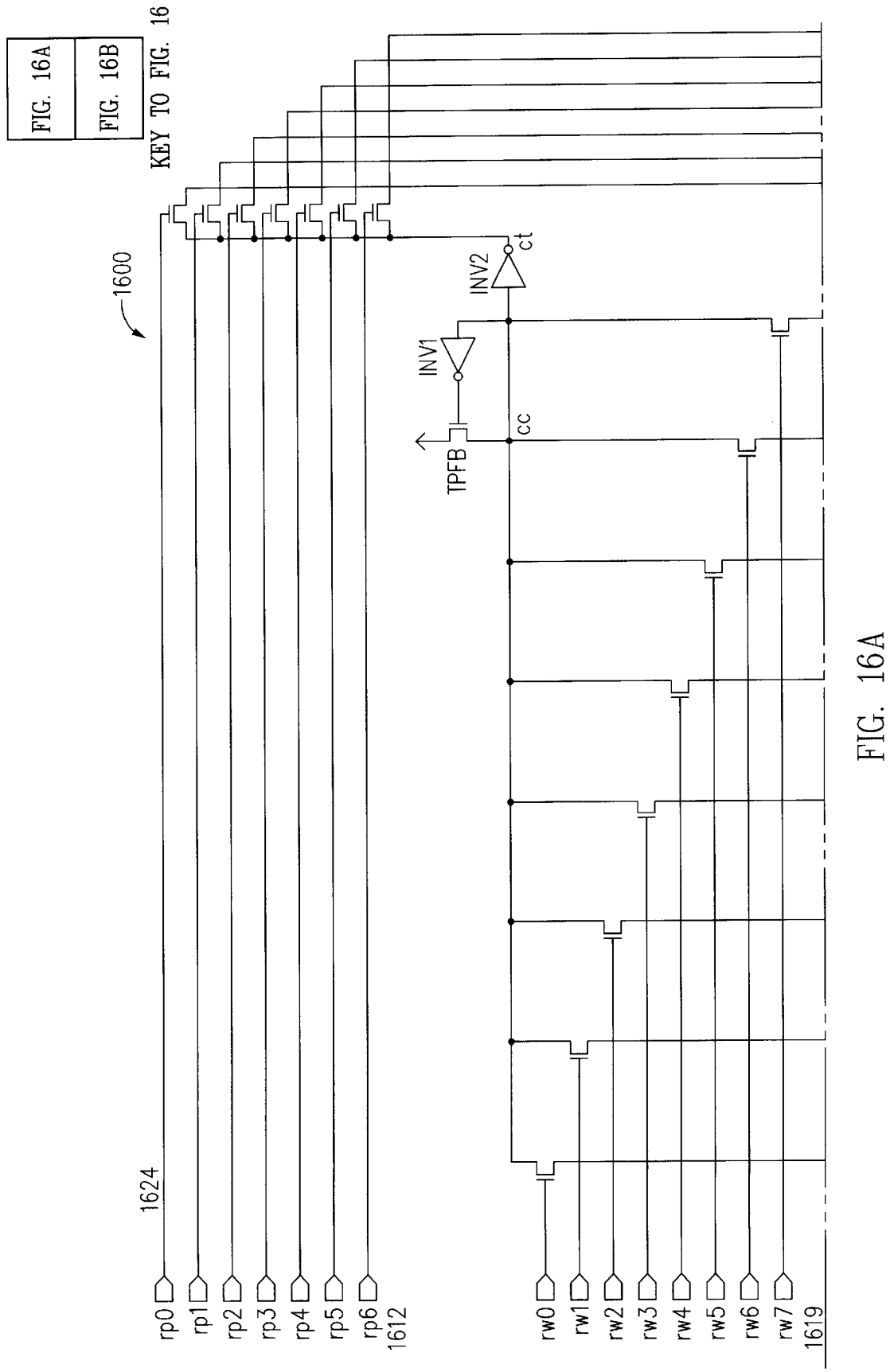
FIG. 16, a schematic circuit diagram illustrates a suitable bit storage circuit storing one bit of the local registers for the multi-dimensional register file with eight windows.
Figure 16B:
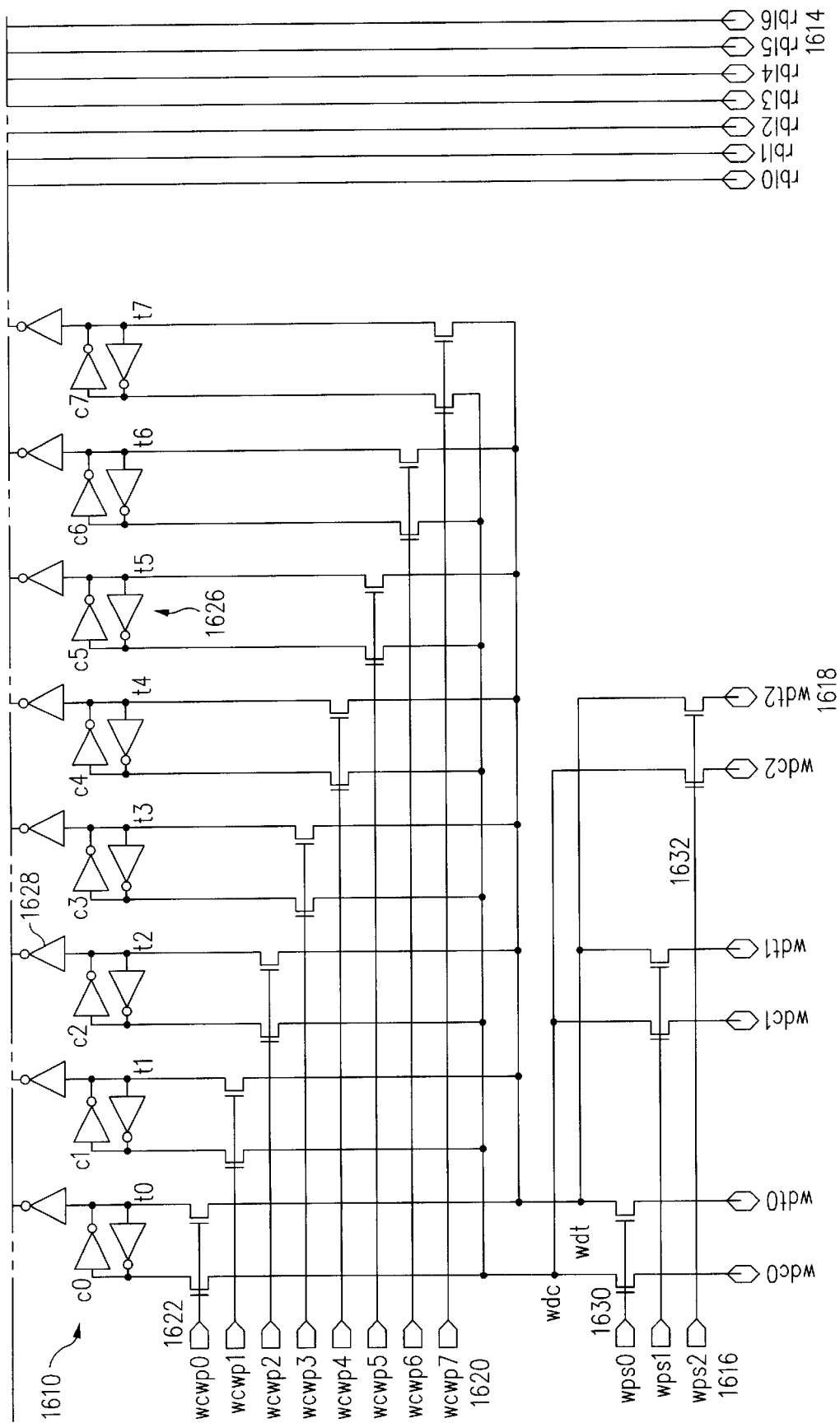

Referring to FIG. 16, a schematic circuit diagram illustrates a suitable bit storage circuit 1600 storing one bit of the local registers for the multi-dimensional register file 1300 with eight non-overlapping windows. The multi-dimensional register file 1300 is useful for fast context switching or for implementing local registers which are not shared across a window.

The illustrative bit storage circuit 1600 represents a storage cell 1610 with seven read ports 1612, single-ended read bit lines 1614, three write ports 1616, differential write bit lines .1618, separate read 1619 and write windows 1620, and a decoded (one-hot) current window pointer 1622. The storage cell 1610 does not allow multiple write operations to the same register at one time. The single-ended read bit lines 1614 use significantly less area than a differential sense amplifier implementation (seven lines versus fourteen lines). Single-ended read bit line sensing improves read sensing speed without compromising noise margin by precharging the read bit line above the trip point of the sense amplifier. For example in a typical 3.3V CMOS process, assuming TTLH, the read bit line is precharged to 1.31V which is 0.61V above the sense amplifier trip point of 0.70V. After the read bit line is precharged, selection of one of the memory cells on the read bit line can result in either continuation of the precharged state which the sense amplifier reads as a logic "1", or discharging of the bit line below the sense amplifier trip point, resulting in a read of a logic "0".

The differential write bit lines 1618 allow fast write and robust noise margins. Using a separate window pointer for reads and writes attains a higher performance by allowing more than one window to co-exist in a pipeline. By disallowing multiple writes to the same physical register in the same cycle, the design is simplified without affecting performance since such writes are indicative of an inefficient condition and inherently unsuitable in an in-order processor. Two consecutive writes in the same cycle without an intermediate read operation is not a common programming practice.

Write address decoding takes place in two stages. Predecoders (not shown) are simple static gates. Four-input AND gates perform second stage decoding. One of the four input signals is a write enable signal. Write decoders are disabled when the corresponding write enable is disabled.

The decoded current window pointer 1622 simplifies logic for each bit cell and produces a speed advantage since the pointer can be decoded in parallel with a register index.

Select lines 1624 (rps0, rps1, ..., rps7) for the storage cell 1610 select a register N and cross the full width of the 64-bit register. Read address decoding is performed in two stages using precoders (not shown) that are simple static gates while final stage decoders (not shown) are three-input NAND domino-type gates. To significantly increase the address decoding rate, read address signals are differentially precharged to allow evaluation to begin immediately when address input signals become valid.

The decoded current window pointer 1622 is represented by eight signals (rcwp0, rcwp1, ..., rcwp7), only one of which is active at one time. The decoded current window pointer 1622 selects the window within which register N is accessed. Cross-coupled inverters 1626 are used to store each bit cell. A local inverter 1628 amplifies the signals locally and isolates each cell, avoiding charge sharing. Data read from the individual bit cell is buffered through an inverter INV2 which contains a large pull-down transistor (50 microns versus 8 microns for a corresponding pull-up transistor). The seven bit lines 1624 are precharged so that read access time is determined by read bit line pulldown speed. Inverter INV1 and a pmos transistor TPFB pull a node cc of an intermediate local data bus up to VDD.

Three write select lines 1630 are wps0, wps1, and wps2. Differential writes are implemented so three pairs of differential write bit lines 1632 are used (wdc0, wdt0, wdc1, wdt1, wdc2, and wdc2). The separate decoded current window pointer 1622 is used for the write operations so only one of the eight signals (wcwp0, wcwp1, ..., wcwp7) is active at one time.

Figure 17A:
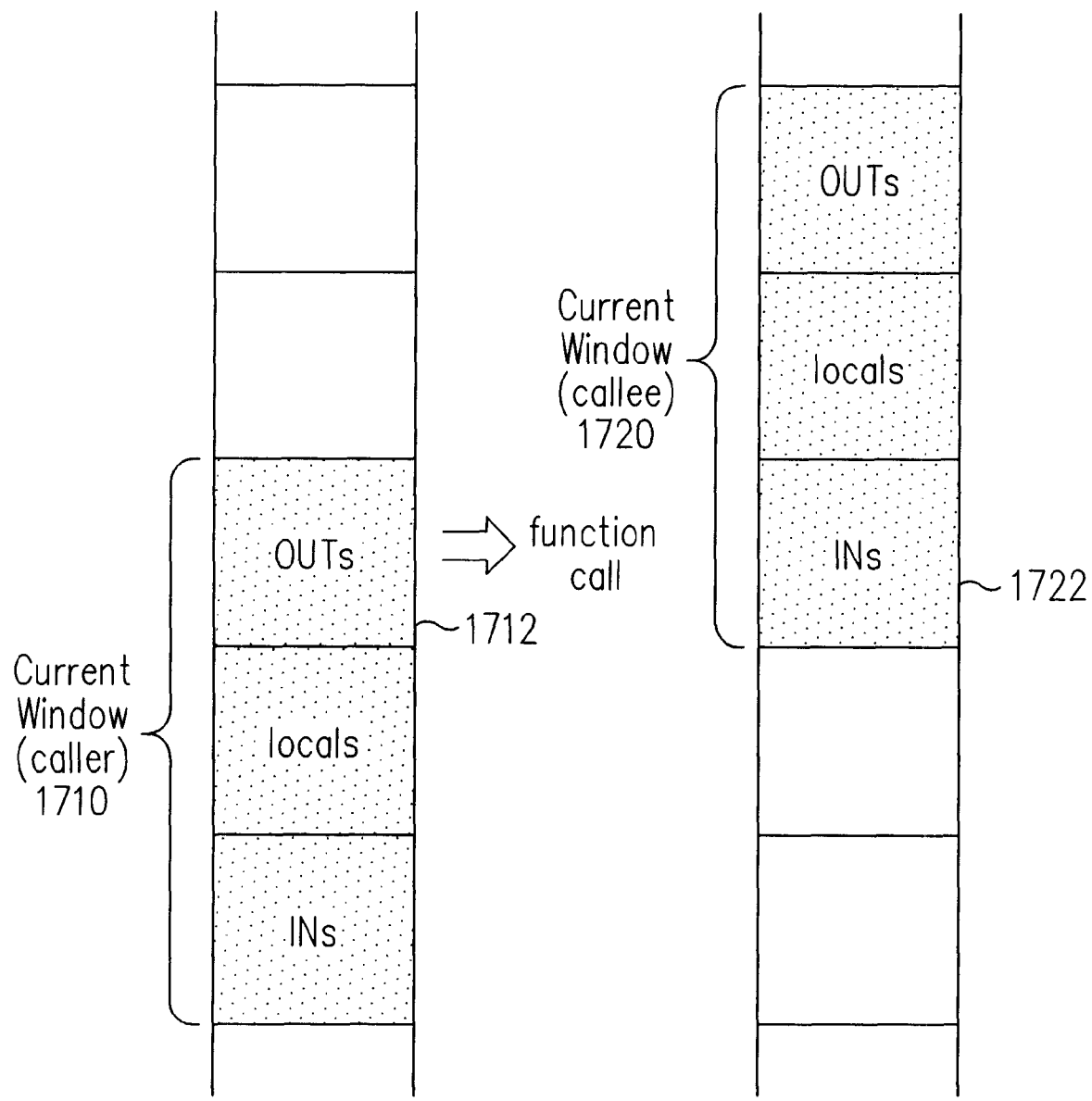
FIGS. 17A and 17B are, respectively, a schematic pictorial diagram and a schematic block diagram illustrating sharing of registers among adjacent windows.

Referring to FIG. 17A, a schematic pictorial diagram illustrates sharing of registers among adjacent windows. Overlapping windows allow a calling function to send parameters to a receiver without additional load and store operations. A calling function has a current calling window 1710 that uses "OUTS" registers 1712 to pass parameters to an adjacent current receiver window 1720 where the registers become "INS" registers 1722 for the receiver. Similarly, on a return from a function call, the receiver can return results through the "INS" registers 1722, which become the "OUTS" registers for the original receiver.

Figure 17B:
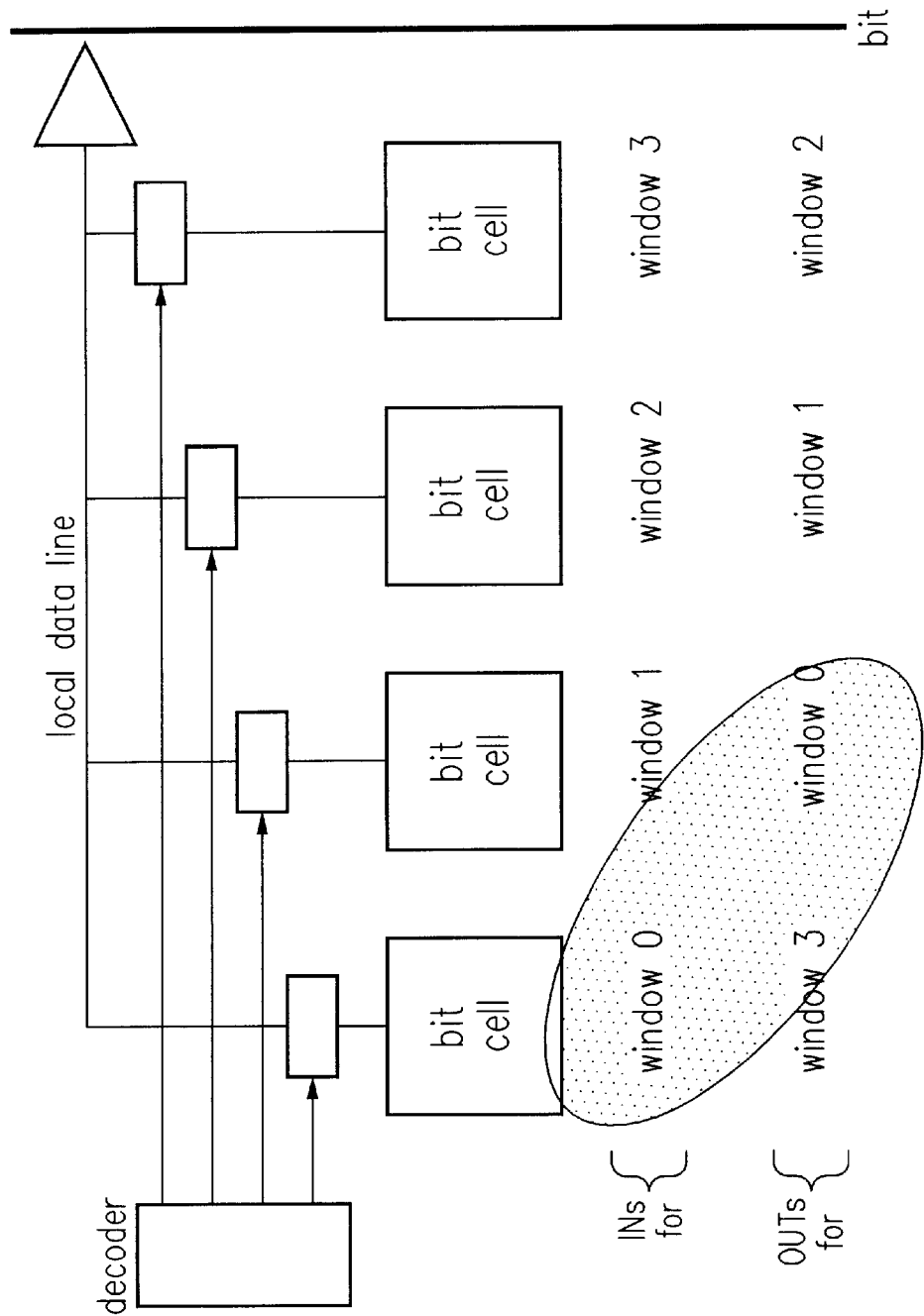
Figure 18A:
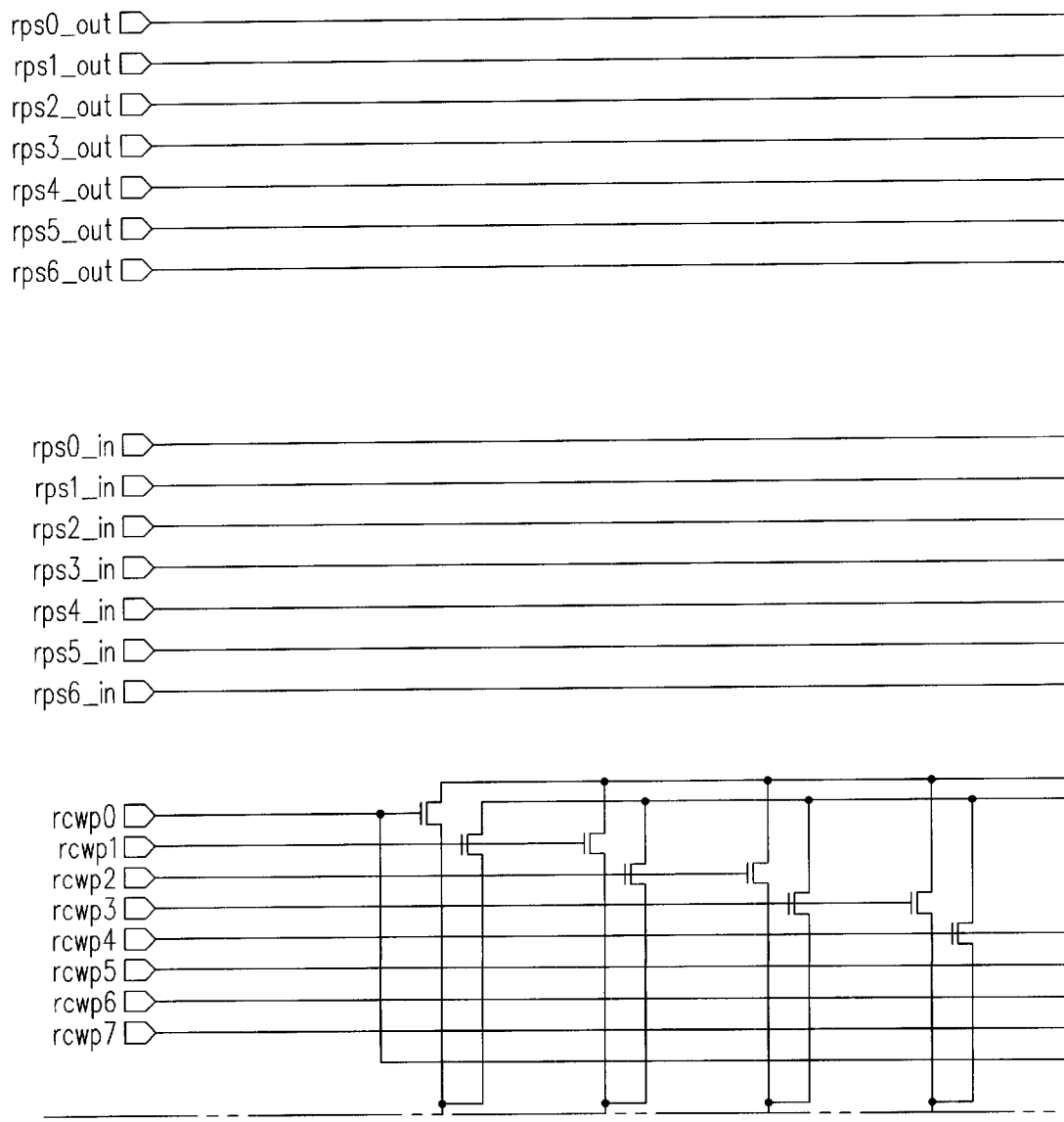
FIG. 18 is a schematic circuit diagram illustrating an implementation of a multi-dimensional register file for registers shared across a plurality of windows.
Figure 18B:
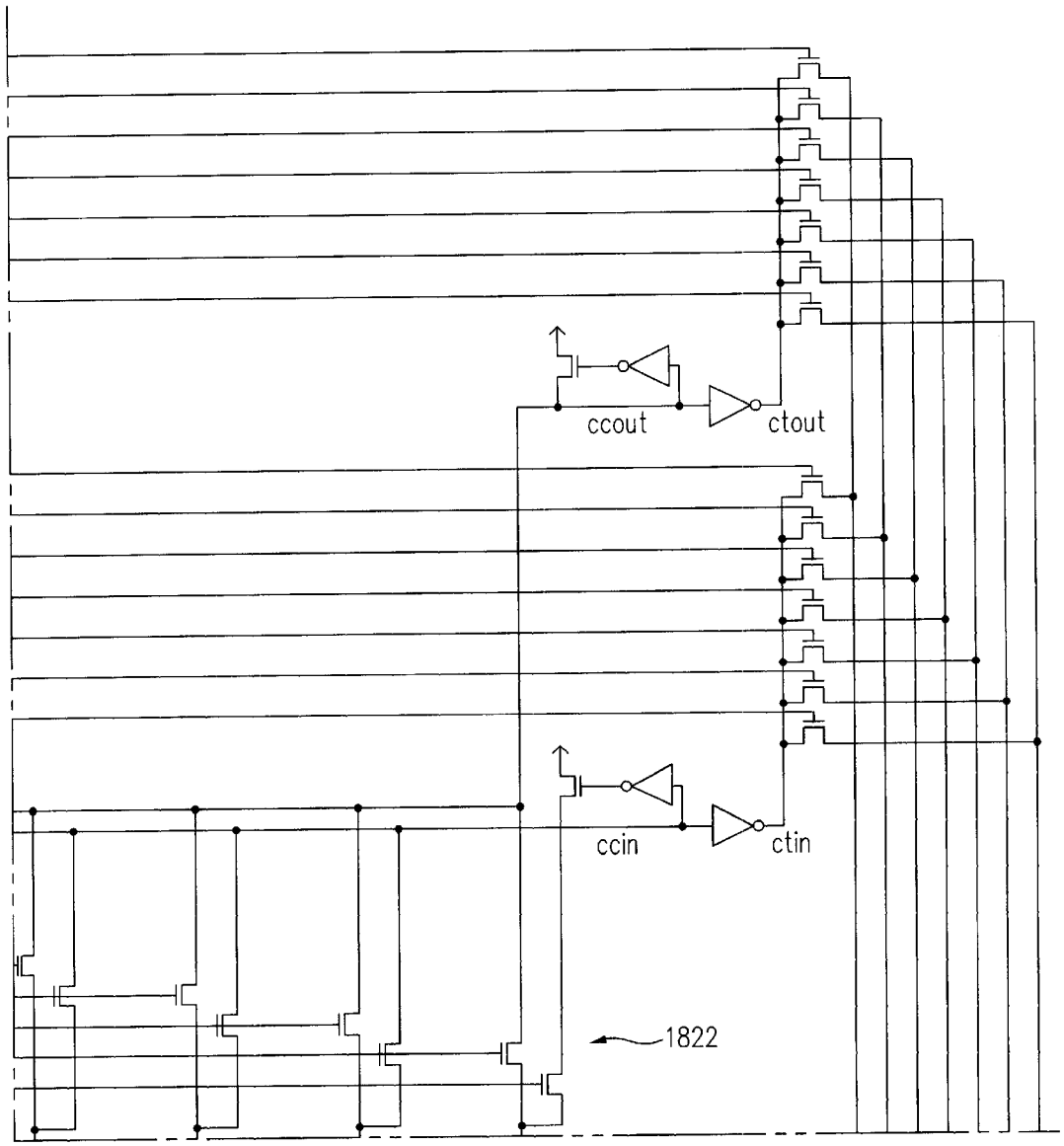
Figure 18C:
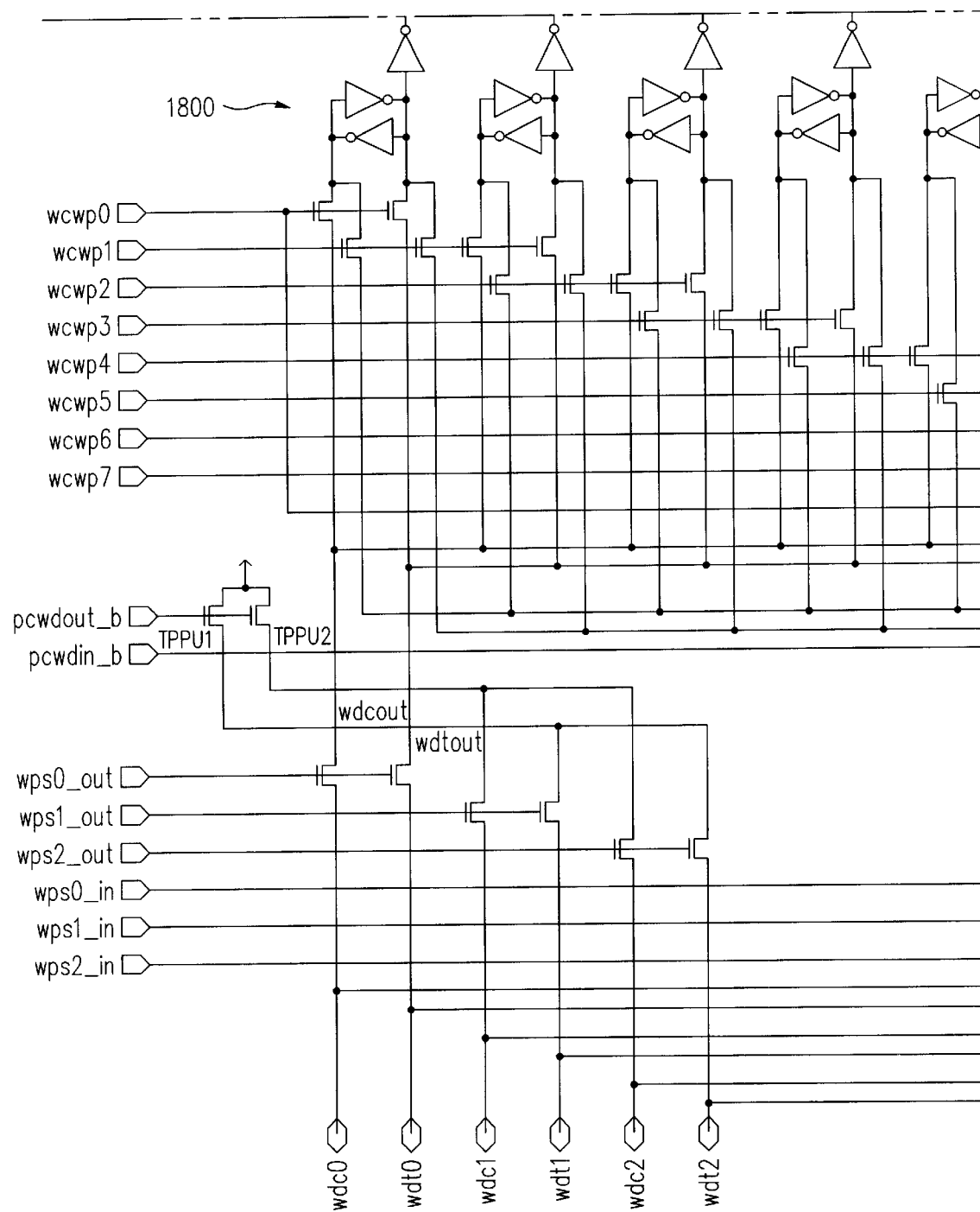
Figure 18D:
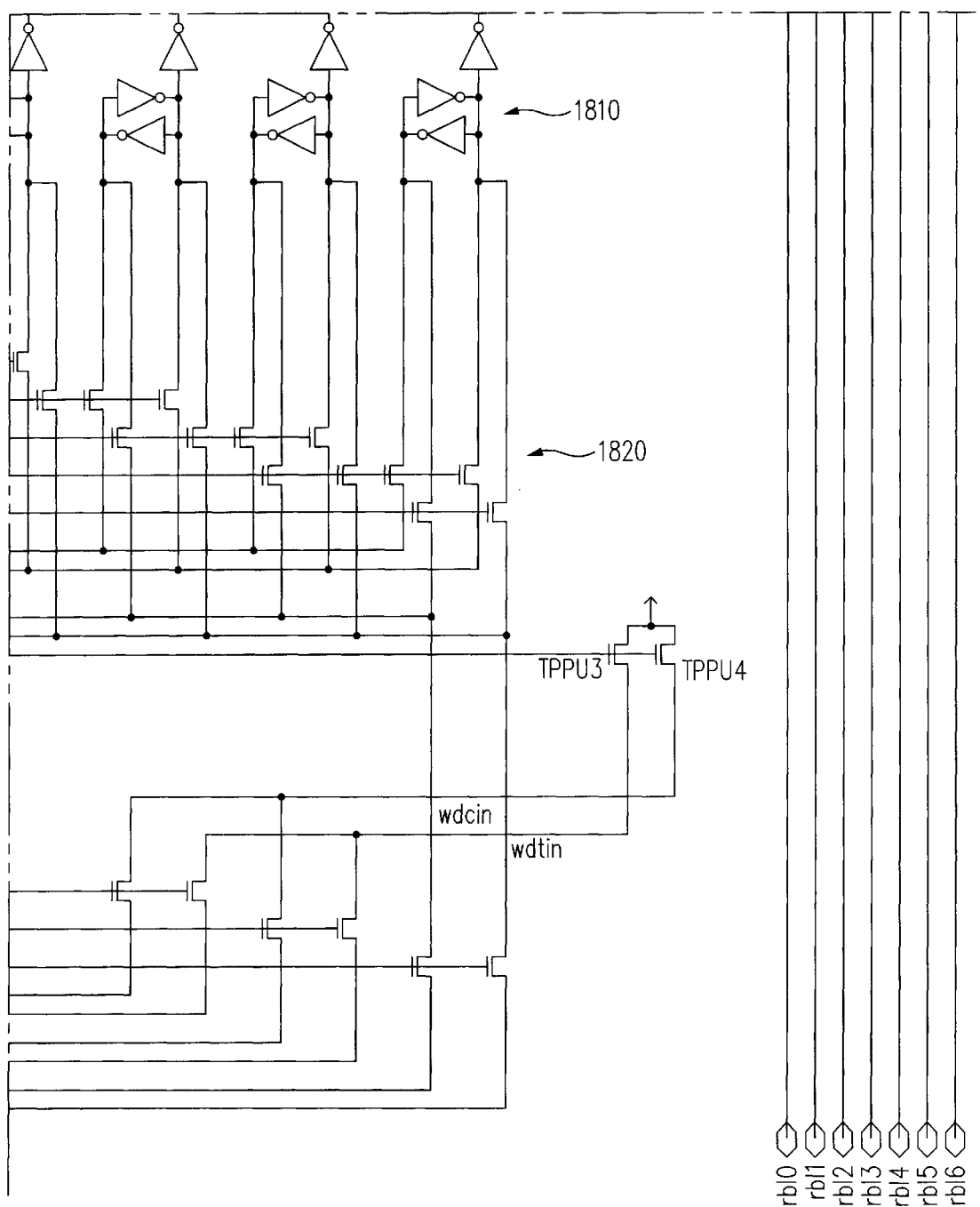

The discussion of FIG. 16 described how bit cells from adjacent windows reside together beneath the metal wires used for accessing a single cell and for supplying window decode signals. Using the same concept for the "INS" and "OUTS" registers, bits for $In_n$ of $window_w$ all reside in one point in the circuit area. Referring to FIG. 17B, a schematic block diagram shows a four-window register file including a set of four bits containing data for $bit_i$ of register $IN_n$ of $window_{w+1}$ which is the same as $bit_i$ of register $OUT_n$ of $window_w$. For a particular window pointer, for example $window_0$, two bit cells, representing the IN and the OUT register are accessible.

Referring to FIG. 18, a schematic circuit diagram illustrates an implementation of a multi-dimensional register file 1300 including registers shared across a plurality of windows. An illustrative storage 1800 includes bit cells 1810 containing data for $IN_i$ and $OUT_i$ registers of $window_j$, two bit cells may be accessed simultaneously by always selecting two possibly addressed cells in the set of eight cells for each window select. For example, assertion of current window pointer rcwp1 selects two cells, cc0 as a possible IN register and cc1 as a possible OUT register. Content of the two cells cc0 and cc1 is driven on separate local buses ccin and ccout. Selection of data for each read port of the IN register or the OUT register is handled by a decoder (not shown). Separate lines supply the IN registers and the OUT registers to select the correct register. A single large buffer with a wide pulldown transistor is included for each bus to conditionally discharge the bit lines.

Write circuitry includes special logic to prevent erroneous overwrites between the IN registers and the OUT registers. Logic 1820 driving the current write window is similar to logic 1822 driving the current read window. One and only one of the current window pointers (wcwp0, wcwp1, ..., wcwp7) is asserted and selects two cells, one IN bit cell and one OUT bit cell. Signals applied at the write decoder level determine whether to drive data from the IN bit cell or the OUT bit cell. Separate signals select a write operation to an IN cell (for example wps0_in) and a write operation to an OUT cell (for example, wps1_out). Since a write operation is data-destructive, a write operation to an IN register is prevented from corrupting the corresponding OUT register and vice-versa, which could occur even though the write data is forwarded to one of the two local write data buses. Write data from one port either is sent to the IN local bus or to the OUT local bus, but not to both. The relatively large capacitance of the local buses could eventually overwrite the content of one of the bit cells since the write window pointer supplies direct access. To prevent the potential write disturbance, pull-up transistors TPPU1, TPPU2, TPPU3, and TPPU4 are used to precharge the local write data lines of inactive ports, effectively operating as a read disturb of the bit cell with little impact on the voltage levels. A condition of two write ports attempting to write to the same IN register or the same OUT register is prevented since multiple write operations to the same destination register are not allowed.

The multi-dimensional register file 1300 has many advantageous characteristics. For example, a capability to pass parameters on function calls and function call returns without having to store and retrieve data through the stack significantly increases performance since load and store operations are often a bottleneck in modern high-performance processors.

Context-switching performance of the processor 1200 is improved by context-switchable storage structures such as a register file with "windows". The windows support different "contexts" for function calls. In one example, the register file with windows is configured as a multiple-dimensional structure with "planes" for fast context switching.

In conventional processors, the data array portion consumes about two-thirds of the total area of a register file. Usage of the multi-dimensional register file 1300 advantageously reduces the data array size by a factor of four to six times for a register file with eight planes. The total area conserved depends on various design trade-offs including: (1) differential versus single-ended bit read sensing, (2) decoded versus encoded plane/window routing, and (3) differential versus single-ended writing. In comparison to conventional "single-window" register files, multiple contexts are attained essentially without cost in terms of integrated circuit area using the multi-dimensional register file 1300 in circuits here read-port and write-port interconnects dominate the cell area of the registers.

In addition to greatly saving circuit area, the multi-dimensional register file 1300 advantageously attains faster access times, primarily by reducing the total capacitance on the bit lines. One bit line only connects to one window in a conventional "single-window" implementation, in comparison to all windows in the multi-dimensional register file 1300. The multi-dimensional register file 1300 results in a reduced total area and shorter bit lines, reducing capacitance. A bit line driver, due to logic sharing among bit cells, may be enlarged, increasing bit line discharge. In addition, independent decoding between the window pointer and the register index results in faster operation.

The multi-dimensional register file 1300 is advantageously used for processors including high-performance superscalar processors as a register file but the applied techniques and structures may otherwise be used in other types of storage devices. For example, multiple-dimension storage structures may otherwise be implemented in various VLIW memory structures, which typically utilize many ports, and to fast context-switching processors which support several contexts through a single structure.

The described processor structure and operating method may be implemented in many structural variations. For example two processor cores are combined with an on-chip set-associative L2 cache in one system. In another example, four processor cores are combined with a direct RAMBUS interface with no external L2 cache. A countless number of variations are possible. In some systems, each processor core is a vertically-threaded pipeline.

While the invention has been described with reference to various embodiments, it will be understood that these embodiments are illustrative and that the scope of the invention is not limited to them. Many variations, modifications, additions and improvements of the embodiments described are possible. For example, those skilled in the art will readily implement the steps necessary to provide the structures and methods disclosed herein, and will understand that the process parameters, materials, and dimensions are given by way of example only and can be varied to achieve the desired structure as well as modifications which are within the scope of the invention. Variations and modifications of the embodiments disclosed herein may be made based on the description set forth herein, without departing from the scope and spirit of the invention as set forth in the following claims. For example, although the illustrative processors include a specified number of threads per pipeline and a specified number of pipelines per integrated circuit chip, various other numbers of threads and pipelines may be implemented in other examples, depending on desired processor applications, semiconductor fabrication techniques, and various size parameters of the processor.

The descriptions contained herein relate to many aspects of processor structure and operating techniques, including structural and functional aspects of various processor components. The structures and techniques are described that are highly useful in combination. However, various structures and techniques are also innovative and highly advantageous when employed alone or in multiple various subcombinations. The invention is to be limited by the claims alone and various limitations that are described in the specification but not included in a particular claim are not to be considered inherent to the claim merely by inclusion in the specification.

What is claimed is:

1. A processor comprising:
   a multiple-thread execution pipeline including a plurality of functional units allocated to an execution thread of a plurality of execution threads; and
   a single-thread interface coupled to the plurality of processing units, the single-thread interface being shared among threads and maintaining thread compatibility by physical duplication of structures and by verifying communication status after thread transfer, wherein:
      the multiple-thread execution pipeline includes a plurality of pulse-based high-speed multiple-bits flip-flops, the pulse-based high-speed multiple-bits flip-flops having a latch structure coupled to a plurality of select-bus lines, the select-bus lines selecting data in the pulsed-based high-speed multiple-bits flip-flops corresponding to an active thread from among the plurality of execution threads.

2. A processor according to claim 1 wherein:
   the single-thread interface includes a load buffer and a store buffer that maintain compatibility with multiple threads so that, on a thread switch, the single-thread interface receives a new thread and maintains the state of a shared structure in a manner that is compatible with the replaced thread.

3. A processor according to claim 1 wherein:
   the single-thread interface includes a load buffer and a store buffer that maintain compatibility with multiple threads by checking read-after-write status of the load buffer and the store buffer.

4. A processor according to claim 1 wherein:
   the single-thread interface includes a load buffer and a store buffer that maintain compatibility with multiple threads by checking load operations against contents of a store buffer in an alternative thread so that read-after-write status information is stored and augmented to store results of read-after-write checks against content of all store buffers.

5. A processor according to claim 1 wherein:
   the single-thread interface identifies a tag using a thread identifier (TID) tag.

6. A processor according to claim 1 wherein:
   the single-thread interface is selected from among devices including caches, translation look-aside buffers, load buffer asynchronous interfaces, store buffer asynchronous interfaces, and memory management units.

7. A processor according to claim 1 wherein:
   the single-thread interface is selected from among non-stalling devices including caches, translation look-aside buffers, load buffer asynchronous interfaces, store buffer asynchronous interfaces, and memory management units.

8. A processor according to claim 1 further comprising:
   a plurality of multiple-thread execution pipelines and a single-thread interface integrated onto a single integrated-circuit chip.

9. A processor comprising:

a multiple-thread execution pipeline including a plurality of execution pathways respectively allocated to a plurality of execution threads; and a single-pathway component coupled to the multiple-thread execution pathways so that the plurality of execution pathways converge into the single-pathway of the single-pathway component, the single-pathway component being non-stalling component wherein:
the multiple-thread execution pipeline includes a plurality of pulse-based high-speed multiple-bits flip-flops, the pulsed-based high-speed multiple-bits flip-flops having a latch structure coupled to a plurality of select-bus lines, the select-bus lines selecting data in the pulsed-based high-speed multiple-bits flip-flops corresponding to an active thread from among the plurality of execution threads.

10. A processor according to claim 9 wherein:

the single-pathway component is shared among a plurality of threads, the single-pathway component maintaining compatibility among threads by physical duplication of structures and by verifying communication status after transfer of a thread.

11. A processor according to claim 9 wherein:

the single-pathway component identifies a tag using a thread identifier (TID) tag.

12. A processor according to claim 9 wherein:

the single-pathway component is selected from among devices including caches, translation look-aside buffers, load buffer asynchronous interfaces, store buffer asynchronous interfaces, and memory management units.

13. A processor according to claim 9 further comprising:

a plurality of multiple-thread execution pipelines and the single-pathway component integrated onto a single integrated-circuit chip.

14. A processor comprising:

a multiple-thread execution pipeline including a plurality of execution pathways respectively allocated to a plurality of execution threads; and a single-thread cache coupled to the multiple-thread execution pipeline so that the plurality of execution pathways converge into the single-thread of the cache, the single-thread cache being shared among threads and maintaining thread compatibility by segregation of the cache into N parts, wherein:
the multiple-thread execution pipeline includes a plurality of pulse-based high-speed multiple-bits flip-flops, the pulsed-based high-speed multiple-bits flip-flops having a latch structure coupled to a plurality of select-bus lines, the select-bus lines selecting data in the pulsed-based high-speed multiple-bits flip-flops corresponding to an active thread from among the plurality of execution threads.

15. A processor according to claim 14 wherein:

cache segregation separates the cache into N independent parts that are allocated to threads to avoid pollution, "cross-talk", and interference between threads.

16. A processor according to claim 14 wherein the cache includes:

a cache index that allocates the threads into the N independent cache parts.

17. A processor according to claim 16 wherein:

the cache index includes a bit field allocated to received thread identification (TID) bits indicative of a part of the N parts of the segregated cache.

18. A processor according to claim 14 further comprising:

a thread switch logic coupled to the multiple-thread execution pipeline and coupled to the cache, the thread switch logic controlling thread selection and generating a thread identifier (TID) indicative of the selected thread.

19. A processor according to claim 14 further comprising:

a thread switch logic coupled to the multiple-thread execution pipeline and coupled to the cache, the thread switch logic controlling thread selection and generating a thread identifier (TID) indicative of the selected thread; and a thread control logic coupled to the thread switch logic and supporting lightweight processes and native threads, the thread control logic disabling thread ID tagging and disabling cache segregation for lightweight processes and native threads that share a single virtual tag space.

20. A processor according to claim 14 further comprising:

a plurality of multiple-thread execution pipelines and the cache integrated onto a single integrated-circuit chip.

21. A processor comprising:

a multiple-thread execution pipeline including a plurality of execution pathways respectively allocated to a plurality of execution threads; and a non-stalling component coupled to the multiple-thread execution pathways so that the plurality of execution pathways converge into a single-pathway including the non-stalling component, wherein:
the multiple-thread execution pipeline includes a plurality of pulse-based high-speed multiple-bits flip-flops, the pulsed-based high-speed multiple-bits flip-flops having a latch structure coupled to a plurality of select-bus lines, the select-bus lines selecting data in the pulsed-based high-speed multiple-bits flip-flops corresponding to an active thread from among the plurality of execution threads.

22. A processor according to claim 21 wherein:

the non-stalling component is selected from non-stalling components including caches, translation look-aside buffers (TLBs), load buffer asynchronous interfaces, and external MMU interface.

23. A processor according to claim 21 further comprising:

thread tagging logic coupled to the non-stalling component, the thread tagging logic for setting a thread identifier (TID) tag identifying threads in the non-stalling component.

24. A processor according to claim 21 further comprising:

a plurality of multiple-thread execution pipelines and the shared components integrated onto a single integrated-circuit chip.

* * * * *